United States Patent
Katoh et al.

(10) Patent No.: US 6,865,789 B2
(45) Date of Patent: Mar. 15, 2005

(54) TOOL HOLDER FOR TURRET LATHE

(75) Inventors: Koichiro Katoh, Aichi-ken (JP); Kazuo Kawasaki, Aichi-ken (JP); Naoya Tanaka, Gifu-ken (JP); Minoru Kitayama, Aichi-ken (JP)

(73) Assignee: Yamazaki Mazak Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/445,637

(22) Filed: May 27, 2003

(65) Prior Publication Data

US 2003/0221525 A1 Dec. 4, 2003

(30) Foreign Application Priority Data

May 31, 2002 (JP) .................................. 2002-160334

(51) Int. Cl.[7] .............................................. B23B 29/32
(52) U.S. Cl. .................. 29/40; 29/39; 29/42; 409/232; 409/234
(58) Field of Search ................. 409/232, 234; 29/39, 40, 27 C, 27 R; 82/121, 159, 120; 74/813 R

(56) References Cited

U.S. PATENT DOCUMENTS

| | | |
|---|---|---|
| 4,640,166 A | 2/1987 | Mizukado et al. |
| 4,769,885 A | 9/1988 | Nakano et al. |
| 4,782,438 A | 11/1988 | Mizukado et al. |
| 4,852,428 A | 8/1989 | Haga et al. ............. 74/826 |
| 4,949,444 A | 8/1990 | Kojima et al. |
| 5,006,685 A | 4/1991 | Hatano et al. |
| 5,007,151 A | 4/1991 | Gushing ............. 29/33 |
| 5,045,664 A | 9/1991 | Nakagawa et al. |
| 5,058,029 A | 10/1991 | Uemura et al. |
| 5,088,361 A | 2/1992 | Kojima et al. |
| 5,095,598 A | 3/1992 | Hiroshi et al. |
| 5,097,575 A | 3/1992 | Mitsukuchi et al. |
| 5,107,730 A | 4/1992 | Muraki et al. |
| 5,115,546 A | 5/1992 | Mitsukuchi et al. |
| 5,157,824 A | 10/1992 | Hiroshi et al. |
| 5,168,609 A | 12/1992 | Kojima et al. |
| 5,175,914 A | 1/1993 | Mitsukuchi et al. |
| 5,191,817 A | 3/1993 | Mitsukuchi et al. |
| 5,254,068 A | 10/1993 | Yamada et al. |
| 5,310,396 A | 5/1994 | Momoi et al. |
| 5,452,503 A * | 9/1995 | Yamamoto et al. ............. 29/40 |
| 5,632,075 A | 5/1997 | Debernardi et al. ............. 29/40 |
| 5,711,192 A * | 1/1998 | Vasilantone ............. 74/827 |
| 5,875,696 A * | 3/1999 | Grossmann ............. 29/40 |
| 5,921,159 A * | 7/1999 | Watkins ............. 29/40 |
| 6,128,812 A * | 10/2000 | Link et al. ............. 29/40 |
| 6,234,731 B1 | 5/2001 | Sakamoto ............. 409/144 |
| 6,453,782 B1 | 9/2002 | Yamazaki et al. |
| 6,483,075 B1 | 11/2002 | Yamazaki et al. |
| 6,502,487 B2 | 1/2003 | Yamazaki et al. |
| 6,536,317 B2 | 3/2003 | Yamazaki et al. |
| 6,565,497 B1 | 5/2003 | Yamazaki et al. |
| 6,612,004 B2 | 9/2003 | Yamazaki et al. |
| 6,715,386 B2 * | 4/2004 | Maier ............. 82/159 |

FOREIGN PATENT DOCUMENTS

EP         0 887 134         12/1998      ............. B23B/3/22

\* cited by examiner

*Primary Examiner*—A. L. Wellington
*Assistant Examiner*—Dana Ross
(74) *Attorney, Agent, or Firm*—Duane Morris LLP

(57) ABSTRACT

A tool holder for attaching a complex tool having a plurality of kinds of cutting edges to a turret, has a base portion attachably and detachably formed at the turret. The base portion has a rotatable tool spindle attachably and detachably installing the complex tool thereon. The tool spindle is provided with indexing means for indexably rotating the tool spindle at an indexed position corresponding to each cutting edge of the complex tool. And, clamping means for clamping the tool spindle at a predetermined indexed position is provided. Indexing rotational function and clamping function owned by the tool holder makes the use of the complex tool in the lathe possible.

7 Claims, 18 Drawing Sheets

FIG. 9
(a)
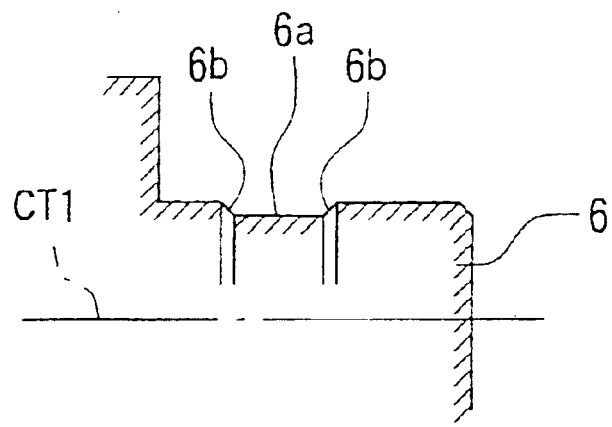
(b)
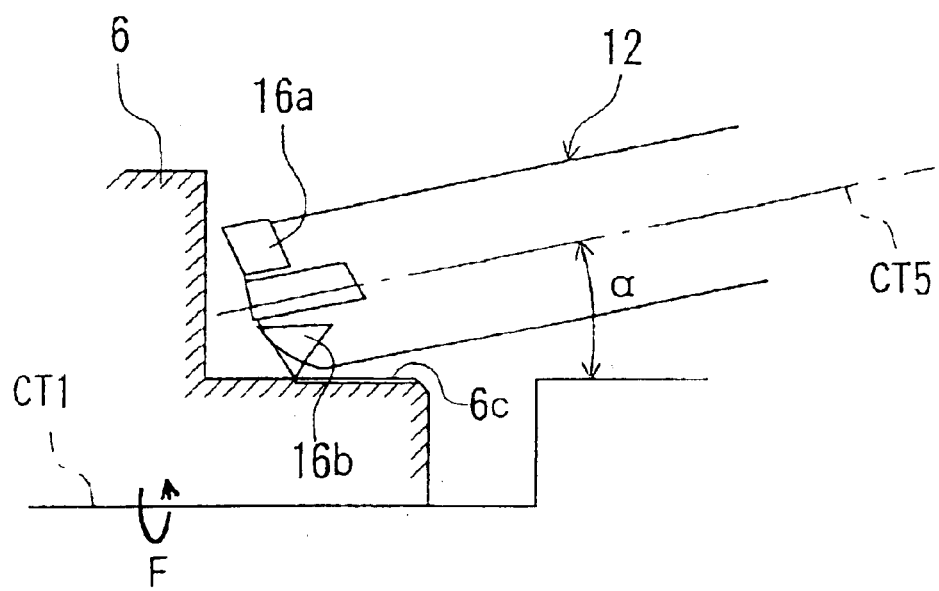

FIG. 10
(a)
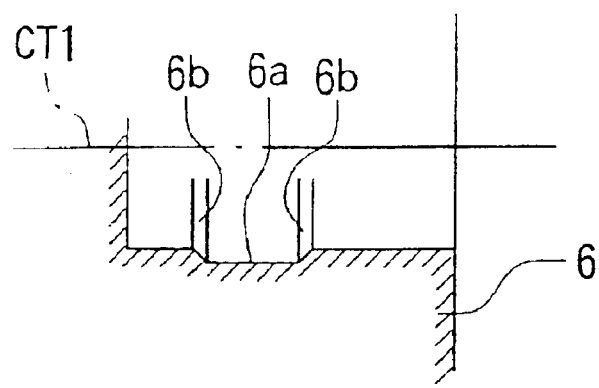
(b)
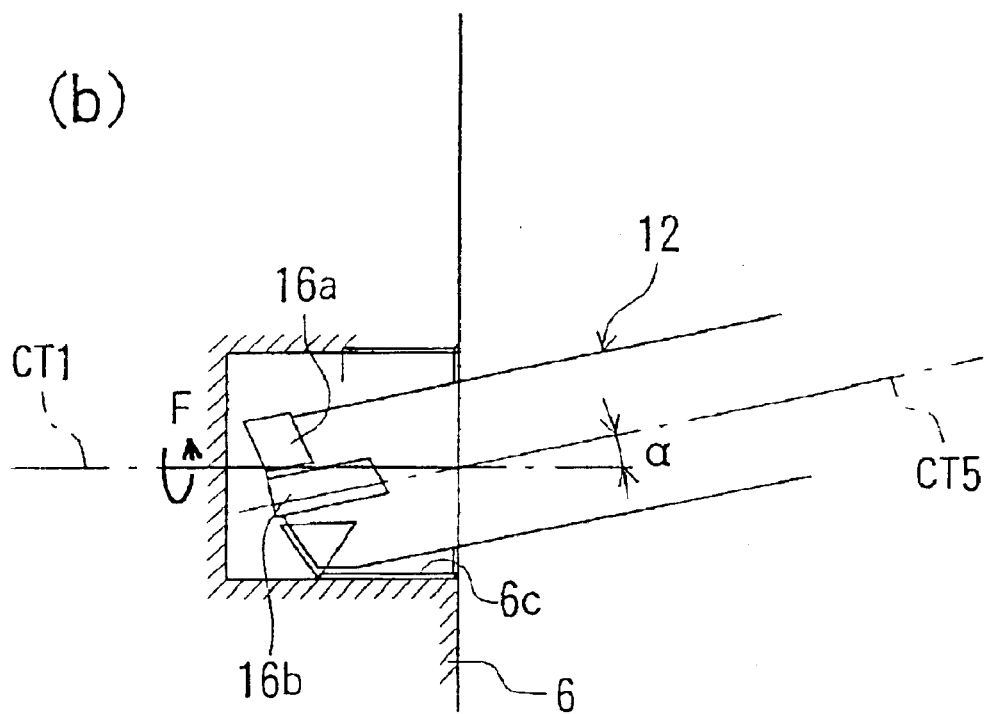

TOOL HOLDER FOR TURRET LATHE

BACKGROUND OF THE INVENTION

This invention relates a tool holder for attaching tools to a turret of a turret lathe, and specifically relates to the tool holder of the turret lathe useful for attaching a complex tool installing a plurality of cutting edges thereon.

In a turret lathe, a number of angles of a turret limits the number of tools to be attached to the turret. For this reason, an ATC lathe equipped with an automatic tool exchanger (ATC), expensive rather than the turret lathe, has been used when the number of the tools necessary for machining is more than the angle of the turret.

In order to soften this limitation, a complex tool having a plurality of cutting edges located on a single body has been proposed. But, the complex tool can not be used in the turret lathe since the turret has no indexing function for selecting a desired cutting edge from the complex tool. Besides, high frequency in exchange of tool increases the time for exchange of tool in the ATC lathe, and the time necessary for machining excluding the time for cutting a workpiece is longer, and the machining efficiency is then lowered.

Under the above-mentioned, circumstances, the development of the tool holder of the turret lathe, having a clamping function for clamping a tool spindle at an indexed position, thereby making the use of complex tool in a turret lathe possible, for exchanging a tool in a short time, has been desired.

SUMMARY OF THE INVENTION

The invention is a tool holder for turret lathe, for attaching a complex tool having a plurality of kinds of cutting edges to a turret of the turret lathe. The tool holder comprises:
- a base portion formed so as to be freely attached and detached at a position for attaching a tool of the turret;
- a rotatable tool spindle provided at the base portion, such that the complex tool can be attached thereto and detached therefrom;
- an indexing means for indexably rotating the tool spindle at an indexed position corresponding to a position where each cutting edge of the complex tool is located, provided at the tool spindle; and
- a clamping means for clamping the tool spindle at the indexed position indexed by the indexing means.

According to an aspect of the invention, the tool holder having the indexing rotational function and the clamping function can make the use of the complex tool in the turret lathe possible. And, the exchange of a cutting edge by the indexing function is shorter than the exchange time of a tool by the ATC, and the machining efficiency in the turret lathe can be thereby improved.

According to the invention, the indexing means has a clutch means at its end. A first means for transmitting outside rotational force is rotatably supported by the base portion. The first means for transmitting outside rotational force is connected with the tool spindle so as to rotate the tool spindle through an outside rotational driving source.

According to an aspect of the invention, the mill spindle located at the turret makes the indexable rotation of the tool spindle possible, and the selected cutting edge of the complex tool is clamped. Then, the indexing of the complex tool is possible with a simple structure having no specific driving source.

In another embodiment, the tool spindle is provided with a milling rotational driving means for successively rotating the tool spindle for milling machining, and the first means for transmitting outside rotational force also functions as the milling rotational driving means.

According to an aspect of the invention, the mill spindle located at the turret makes indexing of the tool spindle and milling machining possible, and the bounds of machining by the complex tool can be broadened.

Besides, the base portion is provided with a second means for transmitting outside rotational force having a clutch means at its end so as to be freely rotated. The base portion is provided with a housing portion rotatably supporting the tool spindle so as to be rotatable with a rotational axis orthogonal to the tool spindle as its center, and the second means for transmitting outside rotational force is connected with the housing portion so as to rotate and position the housing portion with the rotational axis as its center, and the housing portion is provided with the indexing means and the clamping means.

According to an aspect of the invention, the second means for transmitting outside rotational force can rotate and drive the tool holder in the B-axis direction.

And, the housing portion is provided with a milling rotational driving means for successively rotating the tool spindle for milling machining.

According to an aspect of the invention, the milling rotational driving means for successively rotating the complex tool makes the milling machining by the complex tool possible, and the bounds of machining by the complex tool can be broadened thereby.

Besides, the milling rotational driving means also functions as an indexing means.

According to an aspect of the invention, the milling rotational driving means is also the indexing means, and the structure of the tool holder is made simple, thereby.

Besides, the indexing means has a plurality of engagement portions formed at a periphery of the tool spindle, corresponding to the indexed positions, and an actuator capable of reciprocating for rotating and driving the tool spindle at a predetermined rotational angle by engaging with the engagement portion.

According to an aspect of the invention, the indexing means of the tool spindle is comprised of the actuator, and the indexing of the complex tool is certainly executed by a simple indexing operation thereby.

Besides, the actuator has a clamping portion formed so as to freely engage with the engagement portion of the tool spindle.

According to an aspect of the invention, the complex tool can be strongly clamped by the actuator, and the rigidity of the clamping can be improved and the machining efficiency with the complex tool can be improved thereby.

BRIEF DESCRIPTION OF THE DRAWINGS

FIG. 9 shows machining on an outer diameter with the tool holder as shown in FIG. 6, wherein (a) is a schematic view of grooving machining on an outer diameter and (b) is a schematic view of threading machining on an outer diameter;

FIG. 10 shows machining on an inner diameter with the tool holder as shown in FIG. 6, wherein (a) is a schematic view of grooving machining on an inner diameter and (b) is a schematic view of threading machining on an inner diameter;

DESCRIPTION OF THE PREFERRED EMBODIMENT

Embodiments of the invention will now be explained, referring to the appended drawings.

Figure 1:
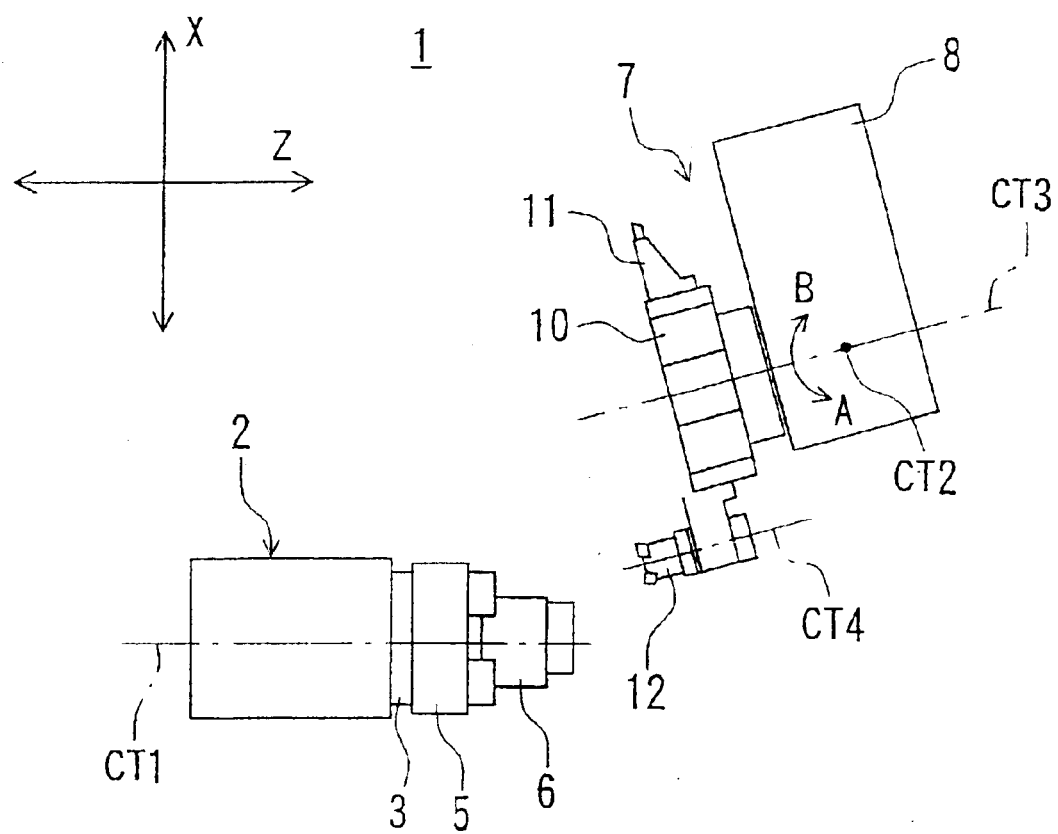
FIG. 1 shows an instance of a turret lathe to which a tool holder according to the invention is applied, and is a plan view showing a positional relation between a spindle stock and a tool rest.

FIG. 1 shows an instance of a turret lathe to which a tool holder according to the invention is applied, and is a plan view showing a positional relation between a spindle stock and a tool rest.

As shown in FIG. 1, a spindle stock 2 of a turret lathe 1 has a spindle 3 rotatably supported with an axial center CT1 as its center and a chuck 5 fixed at one end of the spindle 3 (that is, on the right side of FIG. 1). A workpiece 6 is attachably and detachably held by the chuck 5. A tool rest 7 is arranged so as to freely move in an arrow X direction and in an arrow Z direction which are orthogonal to each other with respect to the spindle stock 2, and has a turret base 8 free to swing in a direction as shown by arrows A and B with a B-axis set in a perpendicular direction (a Y direction) with respect to a paper, orthogonal to the X direction and the Z direction, as an axial center CT2, and a turret 10 supported by the turret base 8 so as to be indexably rotated in a perpendicular plane with an axial center CT3 orthogonal to the axial center CT2 (the B-axis) as its center. A plurality of locations for tools are formed at the turret 10, and a tool 11 and a complex tool 12 rotatable with an axial center CT4 as its center are detachably attached to the locations, respectively. The tool rest 7 may not have a B-axis function of swinging with the axial center CT2 as its center. And, the tool rest 7 may have a driving means (not shown) in the turret 10 and a milling spindle (not shown) to be rotated and driven through the driving means for executing drilling machining or fraise machining such as milling machining by attaching a rotational tool such as a drill or an end mill thereto.

Figure 2:
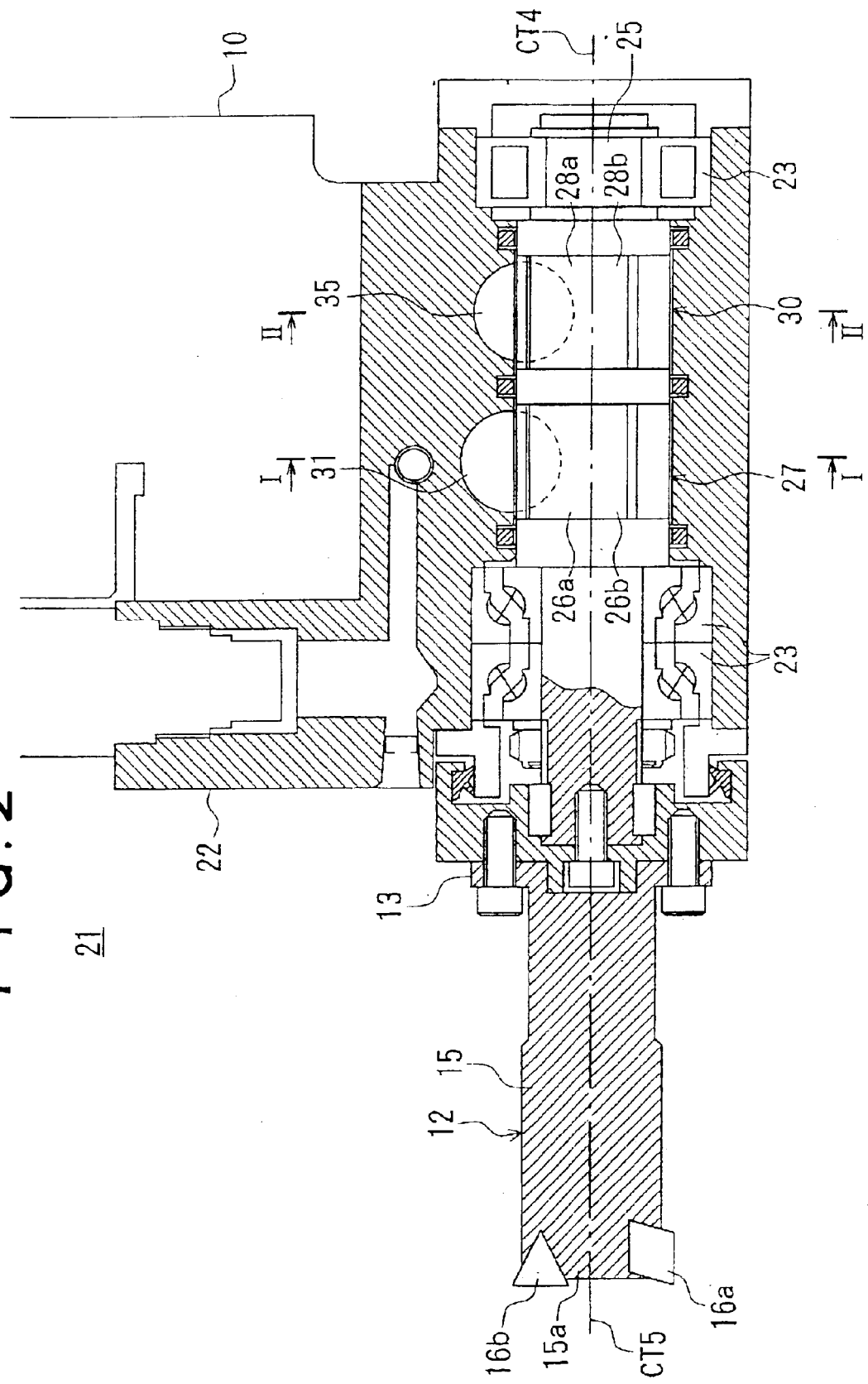
FIG. 2 is a sectional view showing a first embodiment of the tool holder according to the invention.
Figure 3:
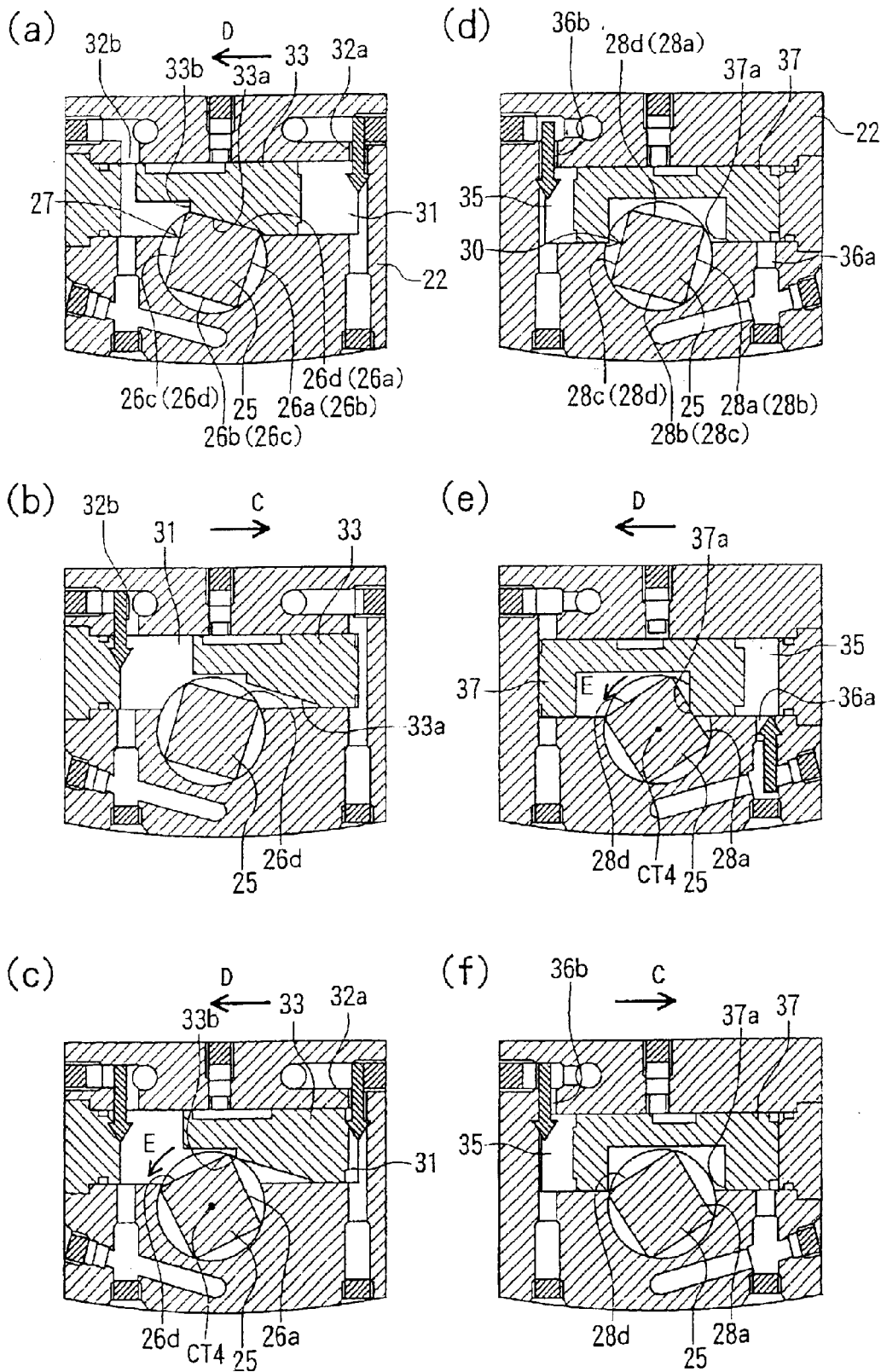
FIG. 3 shows an index rotational mechanism of a complex tool in FIG. 2 and processes of its indexing, wherein each of (a) through (c) is a sectional view of I—I of FIG. 2, and each of (d) through (f) is a sectional view of II—II of FIG. 2.
Figure 4:
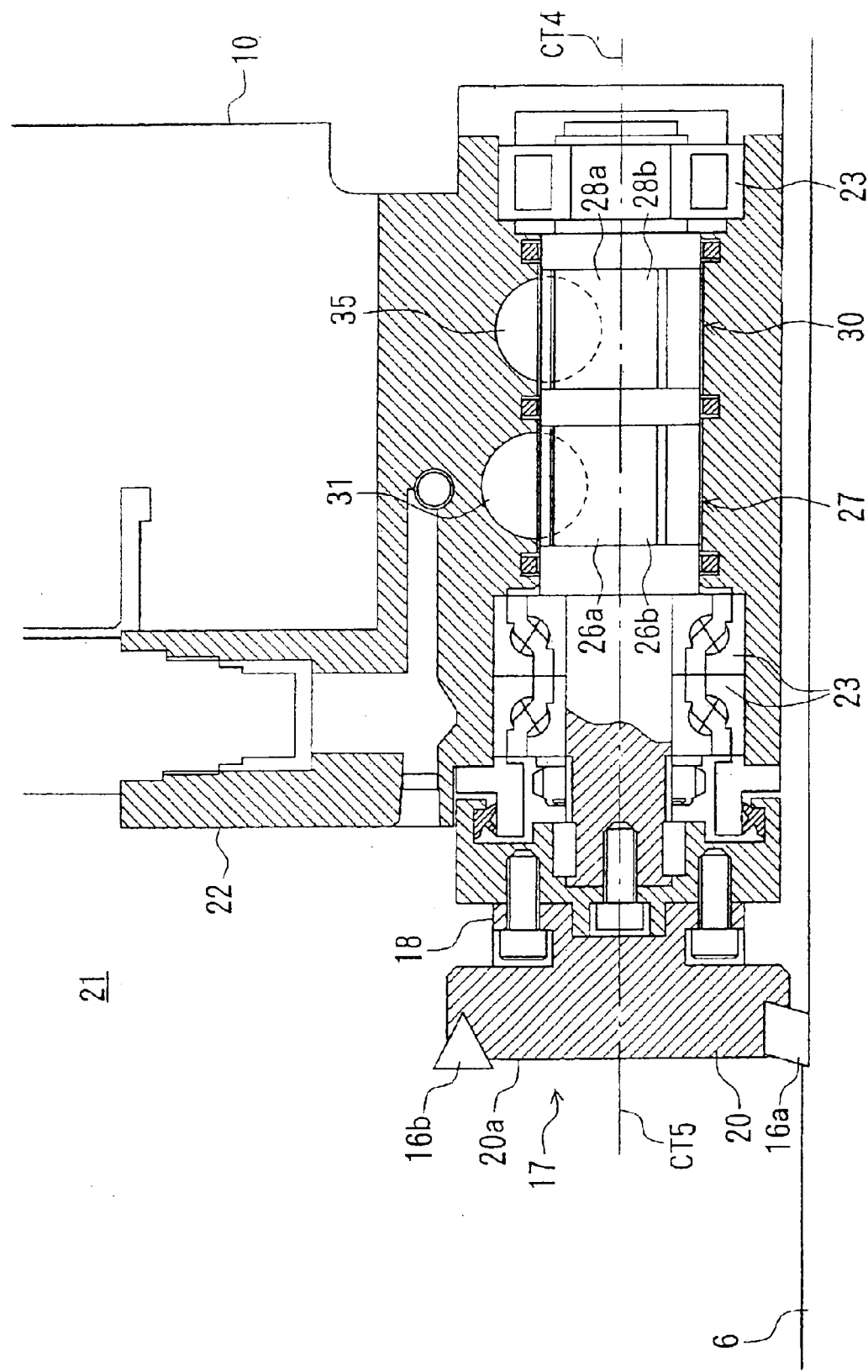
FIG. 4 is a plan view showing machining on an outer diameter of a workpiece by the complex tool supported by the tool holder according to the invention.
Figure 5:
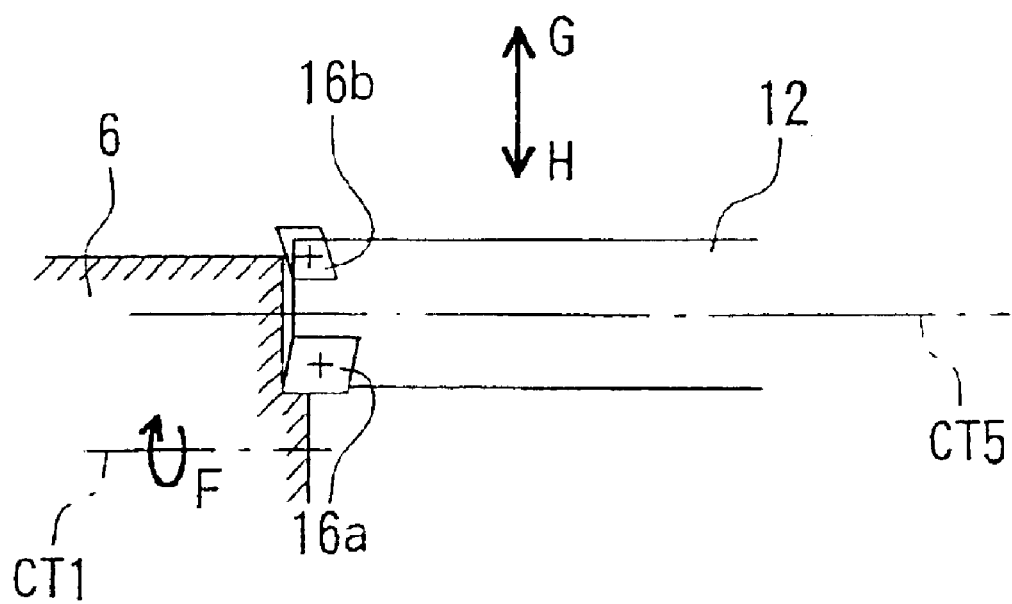
FIG. 5 is a schematic view showing a machining on an end face of a workpiece by the complex tool supported by the tool holder according to the invention.

FIGS. 2 through 5 show the first embodiment of the tool holder according to the invention. FIG. 2 is a sectional view of the tool holder according to the invention, and FIG. 3 shows an index rotational mechanism of the complex tool of FIG. 2 and its index rotational routines, wherein (a) through (c) are sectional views seen from I—I in FIG. 2, and (d) through (f) are sectional views seen from II—II in FIG. 2. FIG. 4 is a plan view showing outer diameter machining on a workpiece through the complex tool supported by the tool holder according to the invention, and FIG. 5 is a schematic view showing end face machining on a workpiece through the complex tool supported by the tool holder according to the invention.

The complex tool 12 to be used in the invention has a flange portion 13 to be attached to a tool spindle mentioned hereinafter, and a main body 15 in the shape of a round bar, projecting from the flange portion 13 so as to have smaller diameter rather than the flange portion 13, as shown in FIG. 2. A plurality of cutting edges 16a, 16b, . . . are attachably and detachably fixed at a top end portion 15a of the main body 15 (a left side end portion of FIG. 2) apart a predetermined space from each other. The other complex tool 17 to be used in the invention has a flange portion 18 to be attached to a tool spindle mentioned hereinafter and a main body 20 in the shape of a disc, projecting from the flange portion 18 so as to have bigger diameter rather than the flange portion 18, as shown in FIG. 4. A plurality of the cutting edges 16a, 16b. . . . are attachably and detachably fixed at a top end portion 20a of the main body 20 (a left side end portion of FIG. 4) apart a predetermined space from each other. The complex tool available in the tool holder of the invention is not limited to the exemplary complex tools 12, 17, but can have the shape fit for target machining as long as the complex tool can be attached to a tool spindle mentioned hereinafter.

As shown in FIGS. 2 and 4, a tool holder 21 has a tool spindle 25 rotatably supported with the axial center CT4 as its center by a housing 22 as a base portion to be attachably and detachably attached to the turret 10 through bearings 23, 23, and the complex tool 12 (17) is attached to an end of the tool spindle 25 (the left side of the figure) so as to be freely attached thereto and detached therefrom such that the axial center CT4 of the tool spindle 25 and an axial center CT5 of the complex tool 12 (17) are corresponded to each other. At a center portion of the tool spindle 25, an operation portion 27 where a rectangle is formed with a plurality of planes 26a through 26d, for indexably rotating the tool spindle 25 and comprising an engagement portion for clamping the tool spindle 25 at the index rotational position, and an operation portion 30 where a rectangle is formed with a plurality of planes 28a through 28d, comprising an engagement portion for indexably rotating the tool spindle 25, are formed. A number of the respective planes 26a through 26d or 28a through 28d forming the operation portion 27 or 30 is the same as a number of locations for attachment of cutting edges which are formed at the complex tool 12 or 17, and a phase around its axial center CT4 or CT5 is corresponded to the location for attachment of a cutting edge which is formed at the complex tool 12 or 17. With such a structure, the operation portions 27, 30 are respectively formed in the shape of almost regular polygon (In this embodiment, the number of the locations for attachment of cutting edges of the complex tool 12 or 17 is four (4) and the operation portions 27 and 30 are respectively formed in the shape of an almost square.).

At a position corresponding to the operation portion 27 of the tool spindle 25 of the housing 22, a fluid pressure cylinder 31 (only "the cylinder 31" hereinafter) is formed, and at the both end portions thereof, ports 32a and 32b which are an entrance and an exit of fluid are formed, as shown in FIG. 3(a). A piston 33 is slidably installed in the cylinder 31. The piston 33 has a clamp face 33a as a clamping portion for restricting rotation of the tool spindle 25 by contacting with one of the planes 26a through 26d formed on the operation portion 27 in the shape of a rectangle of the tool spindle 25, and a driving portion 33b for indexably rotating the tool spindle 25 almost half of a required index rotational angle by contacting with one of the planes 26a through 26d.

At a position corresponding to the operation portion 30 of the tool spindle. 25 of the housing 22, a fluid pressure cylinder 35 (only "the cylinder 35" hereinafter) is formed, and at the both end portions thereof, ports 36a and 36b which are an entrance and an exit of fluid pressure, are formed, as shown in FIG. 3(d). A piston 37 is slidably installed in the cylinder 35. The piston 37 has a driving portion 37a for indexably rotating the tool spindle 25 almost half of a required index rotational angle by contacting with one of the planes 28a through 28d formed on an operation portion 30b of the tool spindle 25.

That is, the piston 33 comprises the clamping means of the tool spindle 25, and the pistons 33, 37 comprise the index rotational means of the tool spindle 25 in this embodiment.

FIG. 3(a) shows such a state that the clamp face 33a of the piston 33 is abutted on the plane 26d of the tool spindle 25 so as to clamp the tool spindle 25 at the index rotational position. At the time of this state, the driving portion 37a of the piston 37 is not contacted with the planes 28a through 28d of the tool spindle 25, as shown in FIG. 3(d).

In order to indexably rotate the tool spindle 25, starting from the above-mentioned state, the inside of the cylinder 31 is supplied with fluid pressure through the port 32b as shown in FIG. 3(b) so as to move the piston 33 in a direction as shown by an arrow C. Then, the clamp face 33a of the piston 33 leaves the plane 26d of the tool spindle 25 and the clamping state of the tool spindle 25 is released, such that the tool spindle can rotate.

Subsequently, the inside of the cylinder 35 is supplied with fluid pressure through the port 36a as shown in FIG. 3(e) so as to move the piston 37 in a direction as shown by an arrow D. Then, the driving portion 37a of the piston 37 contacts with the plane 28a of the tool spindle 25 so as to press the plane 28a in the direction as shown by the arrow D. At this time, the pressing force acts on the tool spindle 25 as a rotating force so as to rotate the tool spindle 25 in a direction as shown by an arrow E since the position where the plane 28a of the operation portion 30 and the driving portion 37a of the piston 37 are contacted with each other is eccentric to the axial center CT4 of the tool spindle 25 on the piston 37 side. The amount of the rotation of the tool spindle 25 by the piston 37 is almost 45 degrees.

And, the inside of the cylinder 35 is supplied with fluid pressure through the port 36b so as to move the piston 37 in the direction as shown by the arrow C, as shown in FIG. 3(f). Then, the driving portion 37a of the piston 37 leaves the plane 28a of the tool spindle 25, such that the tool spindle 25 is in a free state having no contact with the pistons 33, 37.

Subsequently, the inside of the cylinder 31 is supplied with fluid pressure through the port 32a so as to move the piston 33 in the direction as shown by the arrow D, as shown in FIG. 3(c). Then, the driving portion 33b of the piston 33 is abutted on the plane 26a of the tool spindle 25 so as to press the plane 26a in the direction as shown by the arrow D. At this time, the pressing force acts on the tool spindle 25 as a rotating force so as to rotate the tool spindle 25 in a direction as shown by an arrow E since the position where the plane 26a and the driving portion 33b of the piston 33 are contacted with each other is eccentric to the axial center CT4 of the tool spindle 25 on the piston 33 side. The amount of the rotation of the tool spindle 25 by the piston 33 is almost 45 degrees.

When the piston 33 is moved in the direction as shown by the arrow D as shown in FIG. 3(a), the clamp face 33a of the piston 33 is abutted on the plane (26a) of the tool spindle 25. This state shows the tool spindle 25 (that is, the complex tool 12 or 17 attached to the tool spindle 25) indexed 90 degrees. That is, the respective planes 26a through 26d are moved, rotating 90 degrees, as known from a reference number in a parenthesis in FIG. 3(a). At the same time, the tool spindle 25 (that is, the complex tool 12 or 17 attached to the tool spindle 25) is clamped by the clamp face 33a of the piston 33. At this time, the tool spindle 25 is similarly rotated on the cylinder 35 side, and the respective planes 28a through 28d are thereby rotated and moved 90 degrees, as known from a reference number in a parenthesis in FIG. 3(d), changed from the state as shown in FIG. 3(f).

As explained before, the complex tool 12 (17) attached to the tool spindle 25 is indexed by rotating, such that the cutting edge 16a (16b, . . . ) to be used for machining can be positioned at a required position and can be used.

By properly selecting the complex tool 12 or 17 attached to the tool spindle 25, using the tool holder 21 having the above-mentioned structure, turning machining (outer diameter machining) can be executed on the outer peripheral face of the workpiece 6 in the shape of a shaft with the cutting edge 16a, as shown in FIG. 4. And, as shown in FIG. 5, turning machining can be also executed on an end face of the outer diameter of the workpiece 6 with the complex tool 12 as shown in FIG. 2. That is, the complex tool 12 is properly moved in a direction as shown by the arrows G and H (in the Y direction in FIG. 1) with respect to the workpiece 6 rotating at a predetermined rotational speed in the direction as shown by an arrow F with the axial center CT1 of the spindle 3 (see FIG. 1) as its center, such that turning machining can be executed on the end face of the workpiece 6 with the cutting edge 16a.

Figure 6:
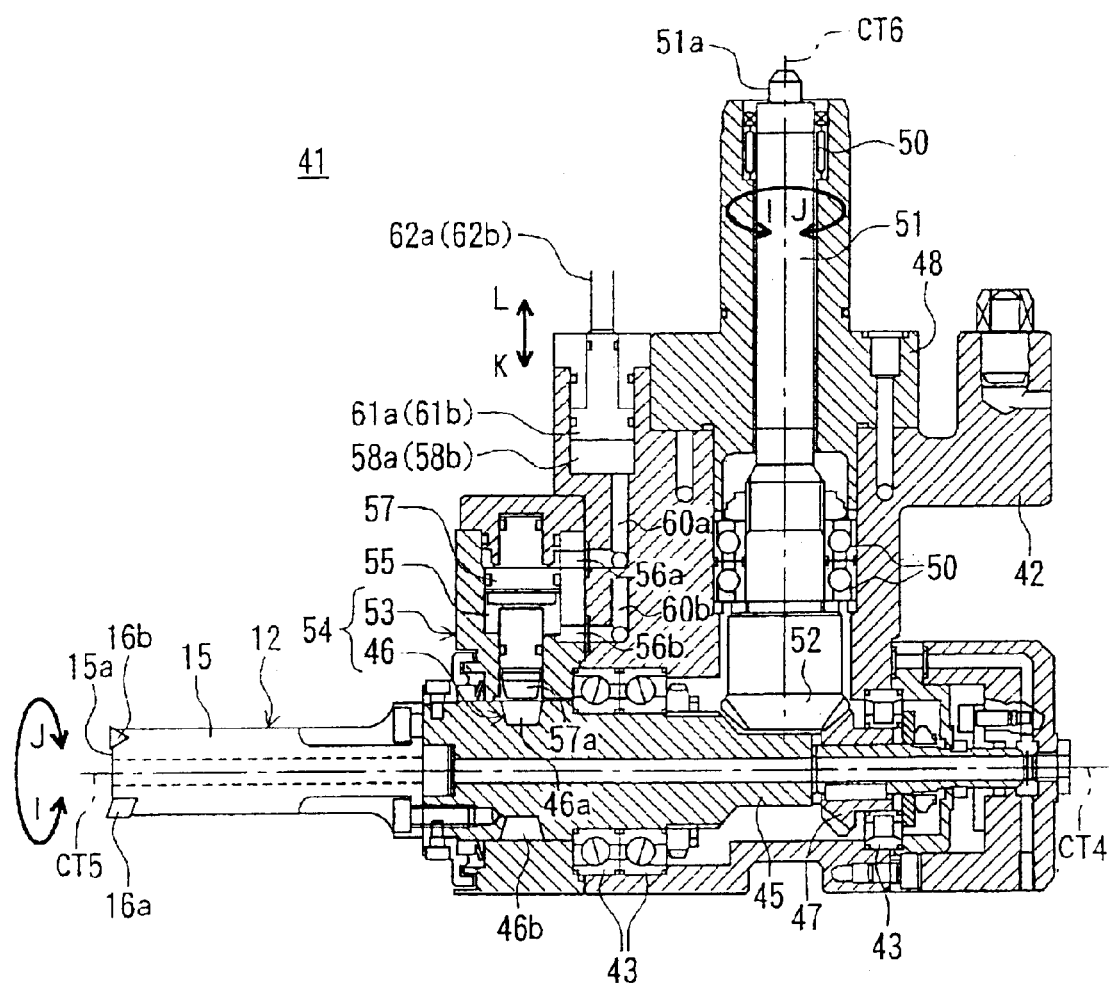
FIG. 6 is a sectional view showing a second embodiment of the tool holder according to the invention.
Figure 7:
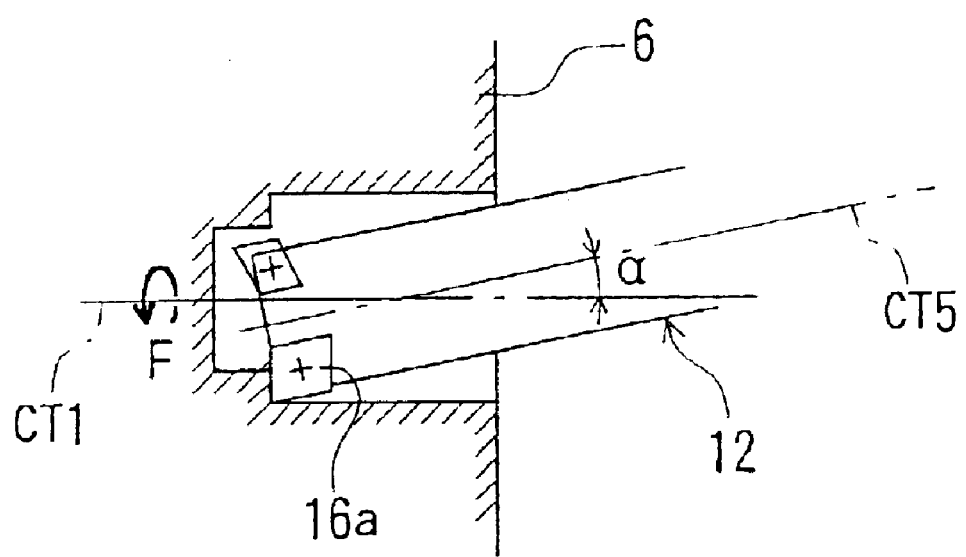
FIG. 7 is a schematic view showing a machining on an inner diameter of the workpiece with the tool holder as shown in FIG. 6.
Figure 8:
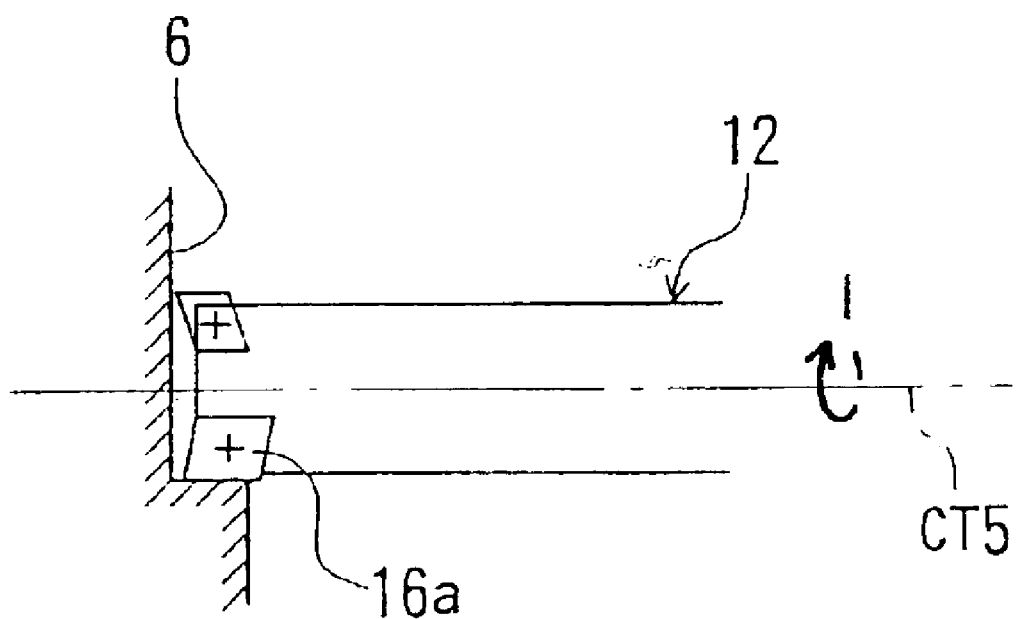
FIG. 8 is a schematic view showing a milling machining with the tool holder as shown in FIG. 6.

FIGS. 6 through 10 show a second embodiment of the tool holder according to the invention. FIG. 6 is a sectional view of the tool holder according to the invention, FIG. 7 is a schematic view showing boring machining with the tool holder as shown in FIG. 6, FIG. 8 is a schematic view showing milling machining with the tool holder as shown in FIG. 6, FIG. 9 is a schematic view showing outer diameter machining with the tool holder as shown in FIG. 6 wherein (a) is a schematic view showing grooving machining on an outer diameter and (b) is a schematic view showing threading machining on an outer diameter, and FIG. 10 is a schematic view showing inner diameter machining with the tool holder as shown in FIG. 6 wherein (a) is a schematic view showing grooving machining on an inner diameter and (b) is a schematic view showing threading machining on an inner diameter. The tool holder as shown in FIG. 6 has a structure suitable to apply to a small typed turret lathe.

As shown in FIG. 6, a plurality of cutting edges 16a, 16b, . . . are attachably and detachably fixed on the top end portion 15a of the main body 15 of the complex tool 12, apart from each other a predetermined space. The tool holder 41 has a tool spindle 45 rotatably supported with the axial center CT4 as its center by a housing 42 as a base portion to be attachably and detachably attached to the turret 10 (see FIG. 1) through bearings 43, 43, and the complex tool 12 is attached to an end of the tool spindle 45 (the left side of the figure) so as to be freely attached thereto and detached therefrom such that the axial center CT4 of the tool spindle 45 and an axial center CT5 of the complex tool 12 are corresponded with each other. A plurality of holes 46 (46a, 46b, . . . ) (the same number as one of locations for tool attachment of the complex tool 12 and the same phase around the axial center CT4) are formed at one end of the tool spindle 45 (the left side of the figure) such that the tool spindle 45 can be fixed at an indexed position when the tool spindle 45 is indexed by rotating. And, a bevel gear 47 is fixed at the other end of the tool spindle 45 (the right side of the figure).

A transmission shaft 51 having a clutch 51a at its top end is supported by a transmission shaft case 48 fixed by the housing 42 through bearings 50, 50, being rotatable with an axial center CT6 as its center. One end of the transmission shaft 51 (the upper side of the figure) is connected with a mill spindle (not shown) located inside the turret 10 (see FIG. 1) so as to be attached thereto and detached therefrom, and a bevel gear 52 engaging with the bevel gear 47 is fixed at the other end (the lower side of the figure) Then, the transmission shaft 51 is rotated and driven in a direction as shown by arrows I and J by the operation of the mill spindle, and the tool spindle 45 (that is, the complex tool 12) is thereby rotated and driven in the direction as shown by the arrows I and J. The mill spindle is rotated and driven by a motor having a rotary encoder therein (not shown), for instance. The motor has both functions, a milling function of successively rotating the tool spindle 45 and a multipoint orientation function of detecting rotational angle by a rotary encoder so as to index the tool spindle 45 by its rotation. That is, the multipoint orientation function of the motor comprises an indexing means for the tool spindle 45.

A clamping means 54 for clamping the tool spindle 45 is comprised of the hole 46 (46a, 46b, . . . ) formed at the tool spindle 45 and a clamp unit 53 located at the side (the left side of the figure) of the housing 42. The clamp unit 53 is fixed by the housing 42 so as to correspond to the hole 46. And, the clamping unit 53 is provided with a fluid pressure cylinder 55 (only "the cylinder 55" hereinafter) and ports 56a and 56b are respectively formed at the both end portions thereof as an entrance and an exit of fluid. A piston 57 is slidably installed in the cylinder 55, and a clamping portion 57a in the shape of a taper, attachably and detachably fittable in the hole 46 (46a, 46b, . . . ) formed at the tool spindle 45 is formed at one end of the piston 57 (the lower side of the figure).

Respectively independent fluid pressure cylinders 58a and 58b (only "the cylinder 58a (58b)" hereinafter) (only cylinder 58a is shown in the figure) are formed at the position adjacent to the clamp unit 53 of the housing 42. The port 56a (56b) formed at the cylinder 55 of the clamp unit 53 is connected with the cylinder 58a (58b) through fluid path 60a (60b). A piston 61a (61b) is installed in the cylinder 58a (58b), being free to be slided.

Fluid is entered into an upper space of the piston 57 of the cylinder 55, the fluid path 60a, a lower space of the piston 61a of the cylinder 58a, an lower space of the piston 57 of the cylinder 55 (the tool spindle 45 side), the fluid path 60b and a lower space of the piston 61b of the cylinder 58b, An operation rod 62a (62b) is located at the turret 10 so as to oppose the piston 61a (61b) apart a minimal space therefrom when attaching the tool holder 41 to the turret 10 (see FIG. 1), and is driven in a direction as shown by arrows K and L by a driving source (not shown)

When the operation rod 62a is moved in the direction as shown by the arrow K so as to press the piston 61a in the direction as shown by the arrow K, the fluid in the cylinder 58a passes through the fluid path 60a and is supplied to the upper space of the piston 57 of the cylinder 55. Then, the piston 57 is moved in the direction as shown by the arrow K for the tool spindle 45 by its fluid pressure, and the clamping portion 57a of the top end thereof is fitted in the hole 46 (46a, 46b, . . . ) of the tool spindle 45 so as to clamp the tool spindle 45 and restrict the rotation thereof. At this time, the piston 61b is pushed out by the piston 57 of the cylinder 55, and is moved in the direction as shown by the arrow L by the fluid flowing from the fluid path 60b into the cylinder 58b.

In such a clamping state that the clamping portion 57a of the piston 57 is fitted in the hole 46 (46a, 46b, . . . ) of the tool spindle 45 so as to restrict the rotation of the tool spindle 45 as mentioned before, turning machining can be executed by the cutting edge 16a (16b, . . . ) of the complex tool 12.

When moving the operation rod 62b in the direction as shown by the arrow K so as to push the piston 61b in the direction as shown by the arrow K, the fluid in the cylinder 58b passes through the fluid path 60b and is supplied into the lower space of the piston 57 of the cylinder 55. Then, the piston 57 is moved in the direction as shown by the arrow L departing from the tool spindle 45 by the fluid pressure and the clamping portion 57a of the top end thereof is detached from the hole 46 (46a, 46b, . . . ) of the tool spindle 45, such that the clamping state of the tool spindle 45 is released. At this time, the piston 61a is pushed out by the piston 57 of the cylinder 55 and is moved in the direction as shown by the arrow L by the fluid flowing from the fluid path 60a into the cylinder 58a.

In such a state that the clamping of the tool spindle 45 is released so that the tool spindle 45 can be rotated as described before, the tool spindle 45 is indexed by rotating through the transmission shaft 51 by intermittently rotating the mill spindle (not shown), so that the cutting edge 16a, 16b, . . . located on the complex tool 12 can be selected. Besides, the tool spindle 45 can be successively rotated through the transmission shaft 51 by successively rotating the mill spindle, and drilling machining and fraise machining such as milling machining wherein the complex tool 12 is successively rotated are thereby possible.

The machining as shown in FIGS. 7 through 10 can be executed by using the tool holder 41 according to this embodiment in the above-mentioned structure in addition to the outer diameter machining on the workpiece 6 by the complex tool 17 as shown in FIG. 4, the end face machining on the workpiece 6 by the complex tool 12 as shown in FIG. 5.

In order to execute inner diameter machining for broadening the diameter of the hole of the workpiece 6 by turning machining, as shown in FIG. 7, the tool rest 7 (see FIG. 1) is turned in the direction as shown by the arrow A with the axial center CT2 of the B-axis as its center so as to position according to a machining program so that the B-axis angle α between the axial center CT1 of the spindle 3 (that is, the workpiece 6) and the axial center CT5 of the complex tool 12 becomes 10 degrees, for instance. On the other hand, the complex tool 12 is indexed by rotating so as to select the cutting edge 16a necessary for machining, and the clamping portion 57a of the piston 57 is fitted in the hole 46a of the tool spindle 45 in FIG. 6 so as to clamp the tool spindle 45 (that is, the complex tool 12). In the above-mentioned state, the workpiece 6 is rotated in the direction as shown by the arrow F with the axial center CT1 as its center so as to properly move the complex tool 12 with respect to the workpiece 6. Then, turning machining is executed on the inner peripheral face of the hole of the workpiece 6 by the cutting edge 16a, and the inner diameter machining can be thereby executed.

In order to execute milling machining for forming a step or a slot on the end face of the workpiece 6 as shown in FIG. 8, the positioning is executed according to a machining program such that the B-axis angle α between the axial center CT1 of the spindle 3 (that is, the workpiece 6) and the axial center CT5 of the complex tool 12 becomes 0 degree. On the other hand, the clamping portion 57a of the piston 57 is detached from the hole 46a of the tool spindle 45 so as to release the clamping state of the tool spindle 45, so that the tool spindle 45 can be rotated, as shown in FIG. 6. And, the spindle 3 is fixed so as to fix the workpiece 6 held by the chuck 5. And, the tool spindle 45 is successively rotated through the transmission shaft 51 so as to successively rotate the complex tool 12 at a predetermined rotational speed in the direction as shown by the arrow I. In the above-mentioned state, the end face of the workpiece 6 is cut in by the complex tool 12 and the complex tool 12 is moved in a proper direction in the plane orthogonal to the axial center CT5, so that the milling machining can be executed.

In the case of the machining for forming a slot 6a on the outer diameter of the workpiece 6 as shown in FIG. 9(a) or the case of the machining for forming a screw 6c on the outer diameter of the workpiece 6 as shown in FIG. 9(b), the tool rest 7 is turned in the direction as shown by the arrow A with the axial center CT2 of the B-axis as its center according to a machining program, and is positioned such that the B-axis angle α between the axial center CT1 of the spindle 3 (that is, the workpiece 6) and the axial center CT5 of the complex tool 12 becomes 20 degrees, for instance. On the other hand, the tool spindle 45 is indexed by rotating so as to select the cutting edge 16b necessary for machining out of a plurality of cutting edges 16a, 16b, . . . attached to the complex tool 12. And, the clamping portion 57a of the piston 57 is fitted in the hole 46b of the tool spindle 45 in FIG. 6 so as to clamp the tool spindle 45 (that is, the complex tool 12). In the above-mentioned state, the workpiece 6 is rotated in the direction as shown by the arrow F so as to properly move the complex tool 12 with respect to the workpiece 6. Then, turning is executed on the workpiece 6 by the cutting edge 16b so as to form the slot 6a or the screw 6c. In the case of the machining for forming the slot 6a on the outer diameter of the workpiece 6, chamfering on both end portions 6b, 6b can be also executed at the same time of turning on the slot 6a due to the shape of the cutting edge 16b.

In case of the machining for forming the slot 6a on the inner diameter of the wrokpiece 6 as shown in FIG. 10(a) or the machining for forming the screw 6c on the inner diameter of the workpiece 6 as shown in FIG. 10(b), the tool rest 7 is turned in the direction as shown by the arrow A with the axial center CT2 of the B-axis as its center according to a machining program, and is positioned such that the B-axis angle α between the axial center CT1 of the spindle 3 (that is, the workpiece 6) and the axial center CT5 of the complex tool 12 becomes 20 degrees, for instance. On the other hand, the complex tool 12 is indexed by rotating so as to select the cutting edge 16b necessary for machining, and the clamping portion 57a of the piston 57 is fitted in the hole 46b of the tool spindle 45 in FIG. 6 so as to clamp the tool spindle 45 (that is, the complex tool 12). In the above-mentioned state, the workpiece 6 is rotated in the direction as shown by the arrow F so as to properly move the complex tool 12 with respect to the workpiece 6. Then, the workpiece 6 is turned by the cutting edge 16b, so that the slot 6a or the screw 6c can be formed. In the case of the machining for forming the slot 6a on the inner diameter of the workpiece 6, chamfering on both end portions 6b, 6b can be also executed at the same time of turning on the slot 6a due to the shape of the cutting edge 16b.

Figure 11:
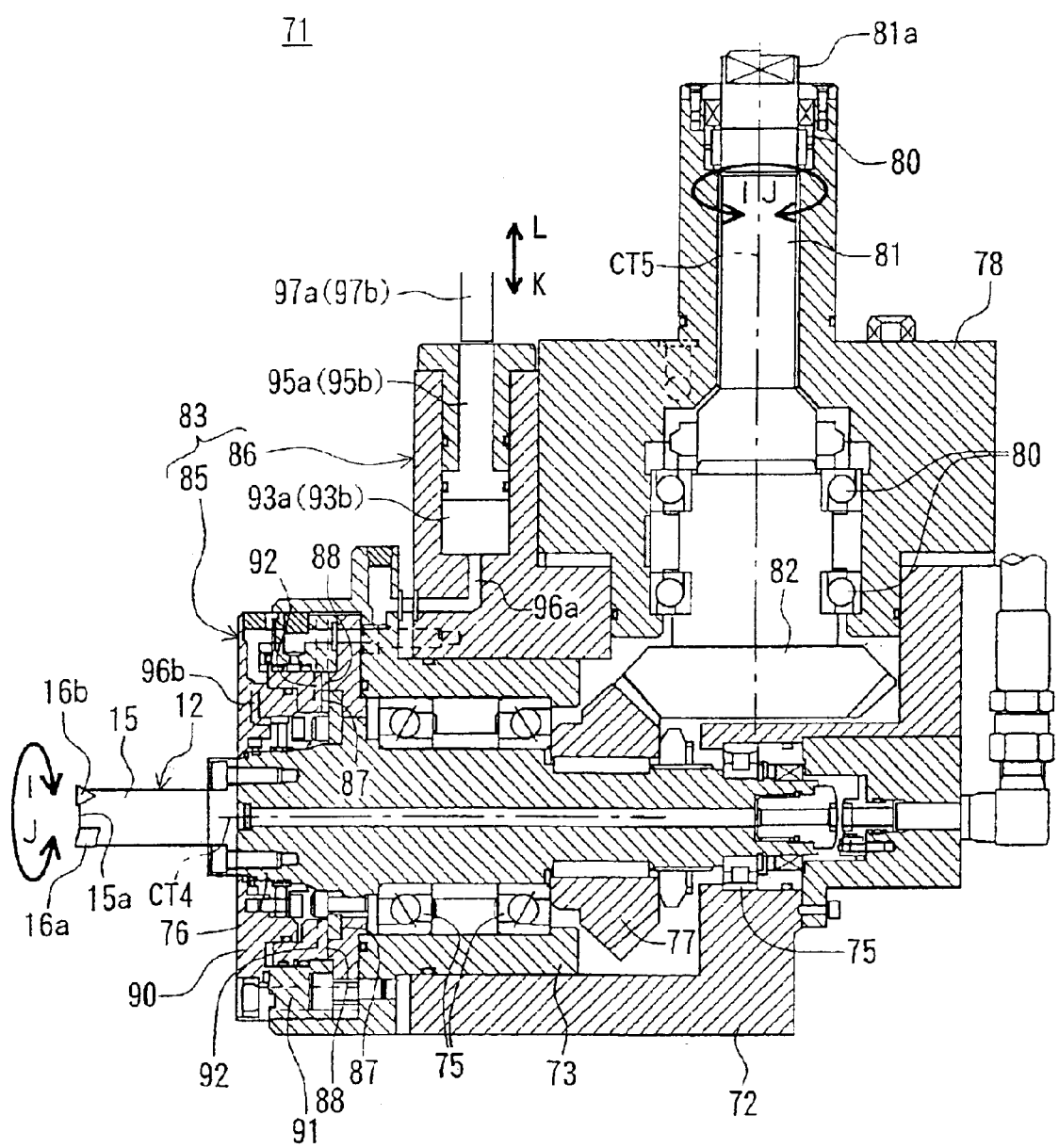
FIG. 11 is a sectional view showing a third embodiment of the tool holder according to the invention.

FIG. 11 shows the third embodiment of the tool holder according to the invention, and is a sectional view of the tool holder according to the invention. The tool holder as shown in FIG. 11 has a structure suitable for applying to a big turret lathe. The structure of the turret lathe will be explained properly referring to FIG. 1 since it is the same as one as shown in FIG. 1.

As shown in FIG. 11, a plurality of cutting edges 16a, 16b, . . . are attachably and detachably fixed at the top end portion 15a of the main body 15 of the complex tool 12, apart a predetermined space from each other. A tool holder 71 has a housing 72, freely attached to and detached from the turret 10 (see FIG. 1), and a tool spindle 76 supported by a bearing case 73 fixed by the housing 72 through a bearing 75, being rotatable with the axial center CT4 as its center. And, the complex tool 12 is attachably and detachably fixed at one end of the tool spindle 76 (the left side end in the figure). A bevel gear 77 is fixed at a center portion of the tool spindle 76.

A transmission shaft 81 is supported by a transmission shaft case 78 fixed by the housing 72 through bearings 80, 80, rotatable with the axial center CT5 orthogonal to the axial center CT4 as its center. A mill spindle (not shown) located inside the turret 10 (see FIG. 1) is connected with a clutch 81a formed at one, end of the transmission shaft 81 (the upper side in the figure), and a bevel gear 82 engaging with the bevel gear 77 is fixed at the other end (the lower side in the figure). The transmission shaft 81 is rotated in the direction as shown by the arrows I and J by the operation of the mill spindle, such that the tool spindle 76 (that is, the complex tool 12) is rotated and driven in the direction as shown by the arrows I and J. The mill spindle is rotated and driven by a motor having a rotary encoder inside (not shown), for instance. The motor has both functions, a milling function of successively rotating the tool spindle 76 and a multipoint orientation function of detecting rotational angle by a rotary encoder so as to index the tool spindle 76 by its rotation. That is, the multipoint orientation function of the motor comprises an indexing means for the tool spindle 76.

A clamping means 83 for fixing the tool spindle 76 at its indexed rotational position is comprised of a three bladed coupling 85 and its driving unit 86. In order to explain the working state of the three bladed coupling 85, an unclamping state is shown on the upper side of the tool spindle 76 and a clamping state is shown on the lower side of the tool spindle 76 in FIG. 11.

The three bladed coupling 85 is comprised of an annular spindle coupling 87 fixed by the tool spindle 76 having a plurality of teeth radially formed on its end face so as to have a predetermined space therebetween, an annular anchoring coupling 88 fixed by the bearing case 73 so as to position on the outer periphery of the spindle coupling 87, having the end face where a plurality of teeth are radially formed apart a predetermined space from each other, and an anullar clamp coupling 92 having the end face opposing to the spindle coupling 87 and the anchoring coupling 88 where a plurality of teeth respectively engaging with the teeth of the spindle coupling 87 and the anchoring coupling 88 are radially formed apart a predetermined space from each other. The clamp coupling 92 is supported by an annular space formed by a head stock 90 and a sealing ring 91 which are fixed to the bearing case 73, slidable in a direction parallel to the axial center CT4 of the tool spindle 76.

The driving unit 86 is comprised of a pair of fluid pressure cylinders 93a, 93b (only cylinder 93a is shown in the figure) (only "the cylinder 93a (93b) thereinafter), which are independently formed in the housing 72, and pistons 95a, 95b respectively installed in the cylinders 93a, 93b being free to be slided. The cylinder 93a is connected with an end of the above-mentioned space installing the clamp coupling 92 therein (the left side in the figure) through a fluid path 96a, and the cylinder 93b is connected with the other end of the space installing the clamp coupling 92 therein (the right side in the figure) through a fluid path 96b, And, fluid is entered in the space formed by the cylinder 93a and the piston 95a, the fluid path 96a, one end of the space (the left side space of the clamp coupling 92), the space formed by the cylinder 93b and the piston 95b, the fluid path 96b, and the other end of the space (the right side space of the clamp coupling 92). The operation rod 97a (97b) (only operation rod 97a is shown in the figure) is located in the turret 10 so as to oppose the piston 95a (95b) with a minimal space when the tool holder 71 is attached to the turret 10, and is driven in the direction as shown by the arrows K and L by a driving source (not shown).

When the operation rod 97a is moved in the direction as shown by the arrow K so as to push the piston 95a in the direction as shown by the arrow K, the fluid in the cylinder 93a passes through the fluid path 96a, and enters in the left side space of the clamp coupling 92. Then, by its fluid pressure, the clamp coupling 92 is moved on the right side of the figure along the axial center CT1 of the tool spindle 76, and the tooth of the clamp coupling 92 is engaged with the teeth of the spindle coupling 87 and the anchoring coupling 88 as shown in the lower side of the tool spindle 76 in FIG. 11, so that the spindle coupling 87 and the anchoring coupling 88 are combined with each other through the clamp coupling 92, and the tool spindle 76 is thereby clamped so as to restrict its rotation. At this time, the piston 95b is moved in the direction as shown by the arrow L by the fluid extruded from the right side space of the clamp coupling 92 and entered in the cylinder 93b via the fluid path 96b.

As mentioned before, in the state of clamping the tool spindle 76 for restricting its rotation, turning is possible with the cutting edge 16a (16b, . . . ) of the complex tool 12. When the tool spindle 76 is clamped by the three bladed coupling 85, the tool spindle 76 can be clamped with high rigidity. Therefore, the position of the complex tool 12 fixed by the tool spindle 76 can be maintained with high accuracy, and more accurate turning machining is possible.

When the operation rod 97b is moved in the direction as shown by the arrow K so as to push the piston 95b in the direction as shown by the arrow K, the fluid in the cylinder 93b passes through the fluid path 96b, and enters in the space of the right side of the paper of the clamp coupling 92. Then, by its fluid pressure, the clamp coupling 92 is moved on the left side of the figure along the axial center CT1 of the tool spindle 76, and the clamp coupling 92 is departed from the spindle coupling 87 and the anchoring coupling 88 as shown on the upper side of the tool spindle 76 in FIG. 11 so as to release the engagement of these teeth, so that the state of clamping the tool spindle 76 is released so as to allow the tool spindle 76 to rotate. At this time, the piston 95a is moved in the direction as shown by the arrow L by the fluid extruded from the left side space of the clamp coupling 92 and entered in the cylinder 93a via the fluid path 96a.

As mentioned before, in such a state that clamping of the tool spindle 76 is released so as to allow the tool spindle 76 to rotate, the tool spindle 76 is indexed by rotating through the transmission shaft 81 by intermittently rotating a mill spindle (not shown), so that the cutting edge 16a, 16b, . . . located at the complex tool 12 can be selected. Besides, the tool spindle 76 can be successively rotated through the transmission shaft 81, also by successively rotating the mill spindle, so that a drilling machining and a fraise machining, such as a milling machining by successively rotating the complex tool 12 are possible.

In such a structure, various kinds of machining as shown in FIGS. 4, 5 and 7 through 10 is possible, similar to the tool holder 41 (see FIG. 6) as shown in the second embodiment.

Figure 12:
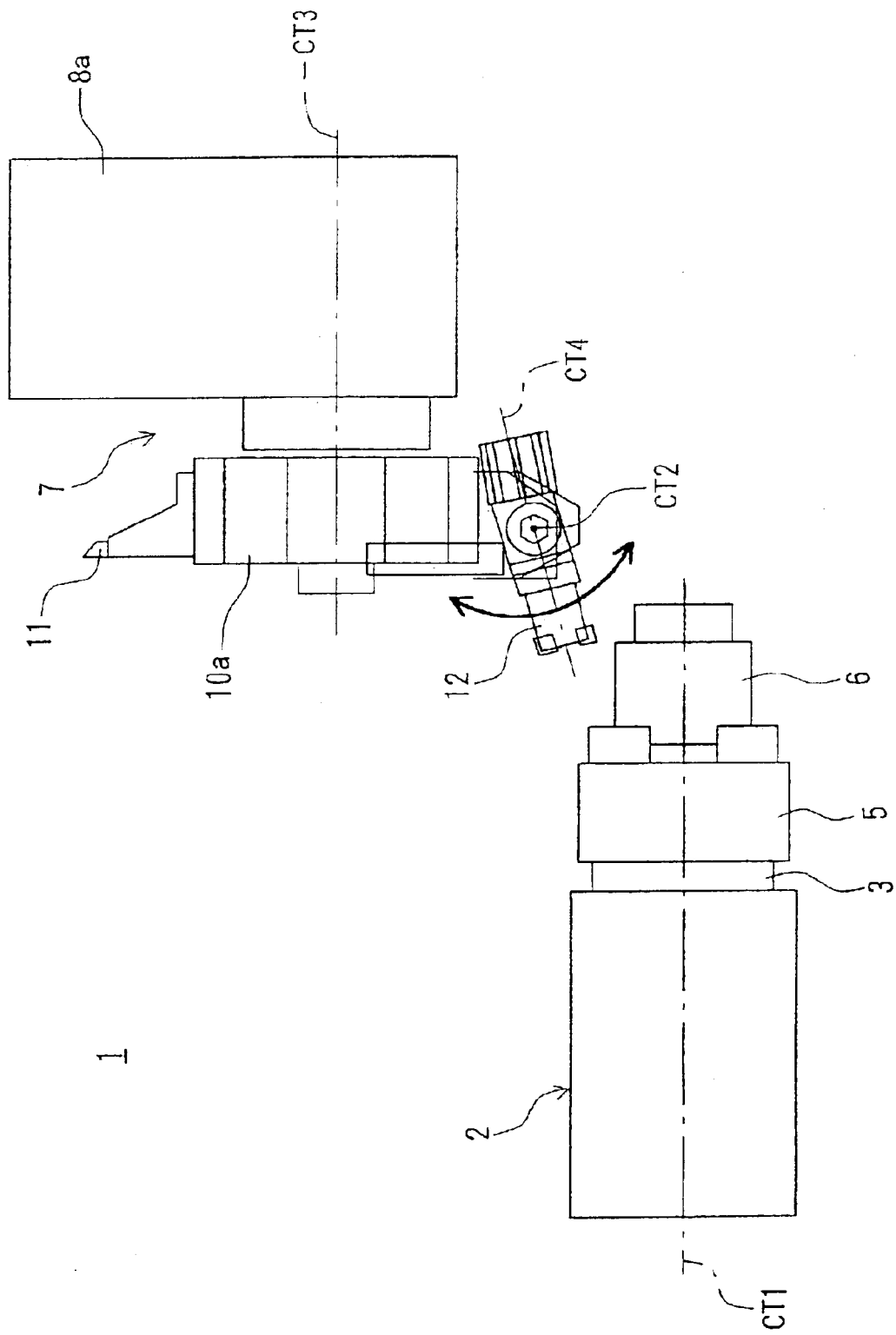
FIG. 12 is a plan view showing a positional relation between the spindle stock and the tool rest in the turret lathe.
Figure 13:
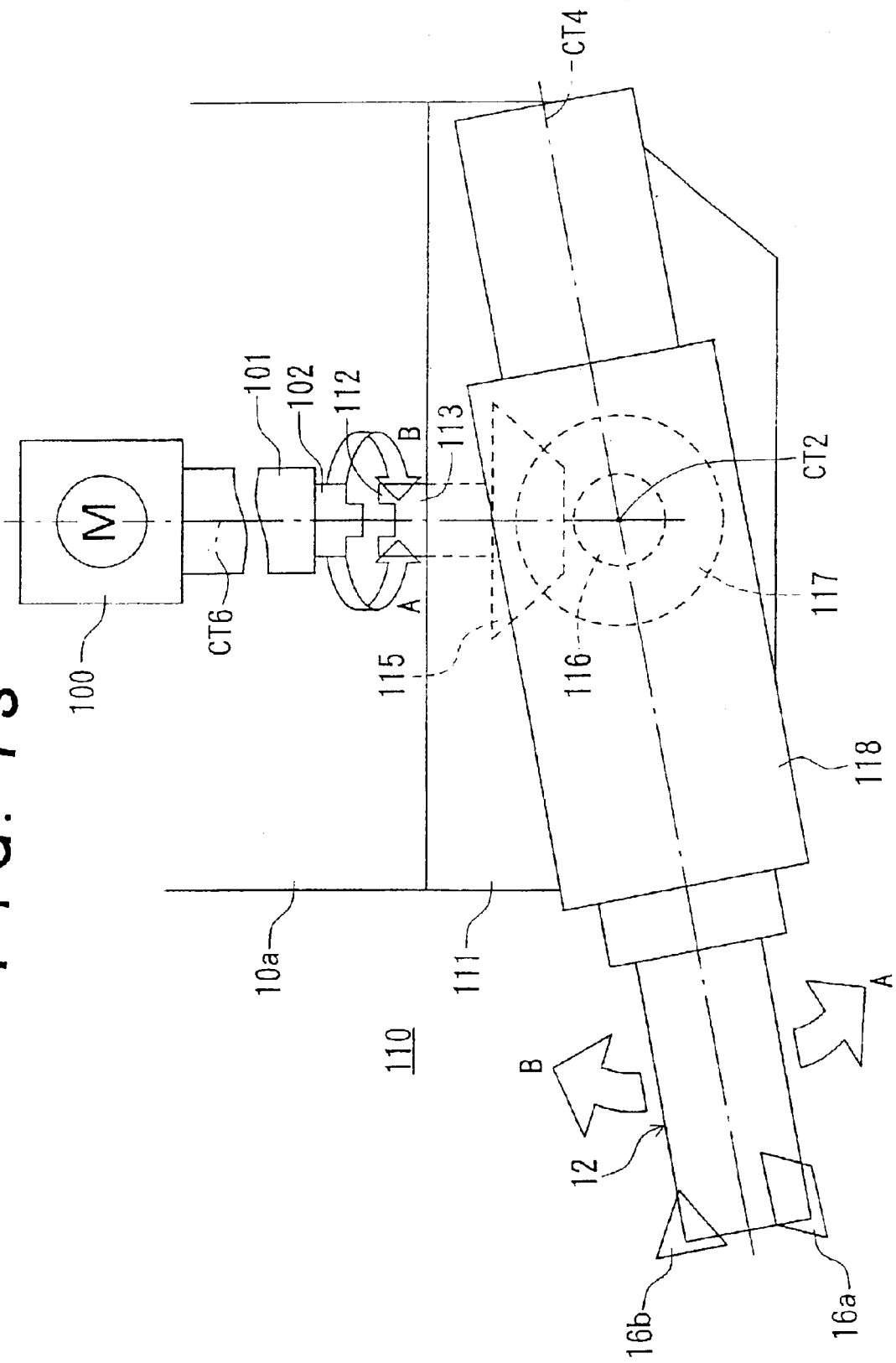
FIG. 13 is a plan view showing a positional relation between a turret and the tool holder.
Figure 14:
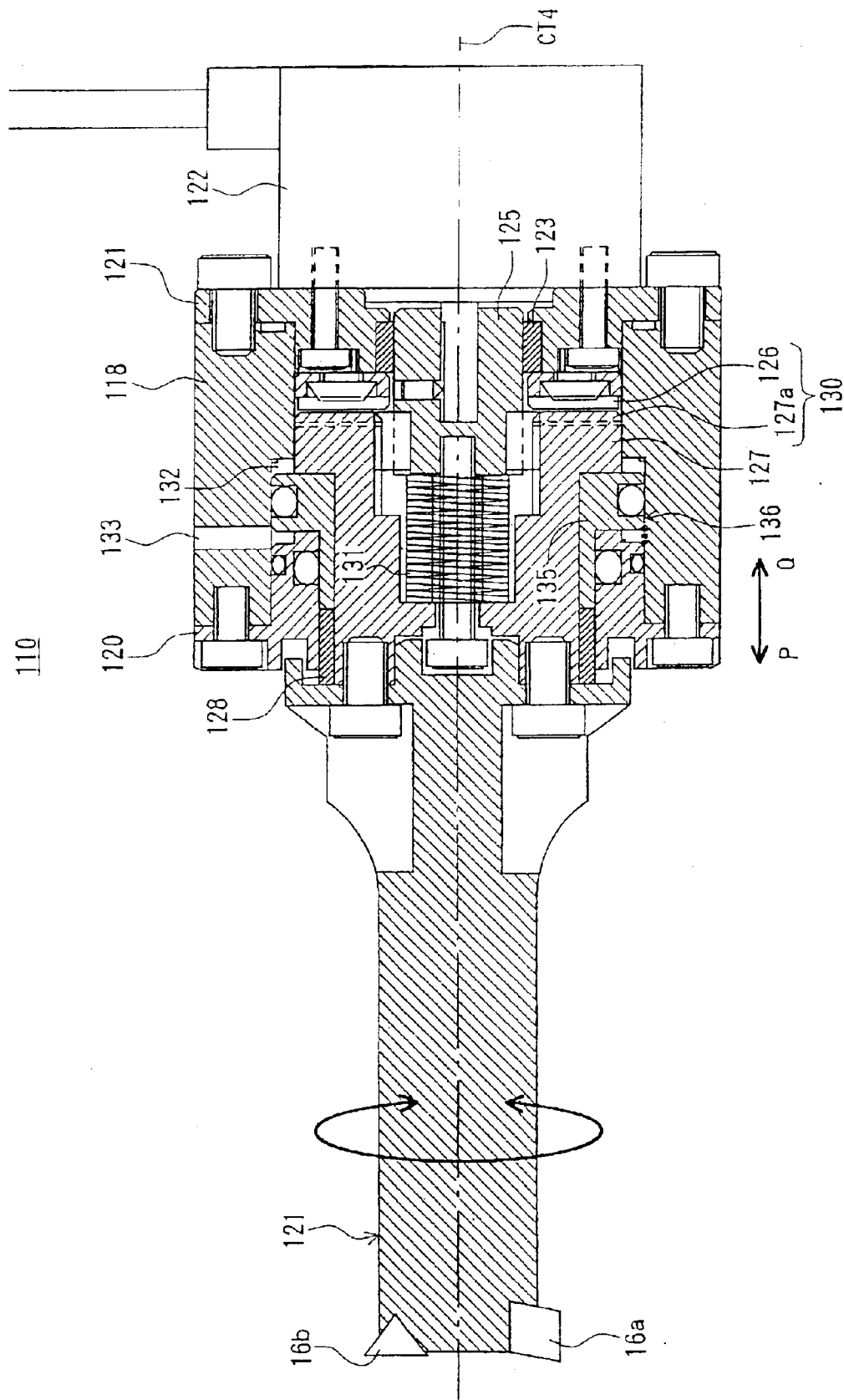
FIG. 14 is a sectional view of a housing portion of the tool holder according to the invention.
Figure 15:
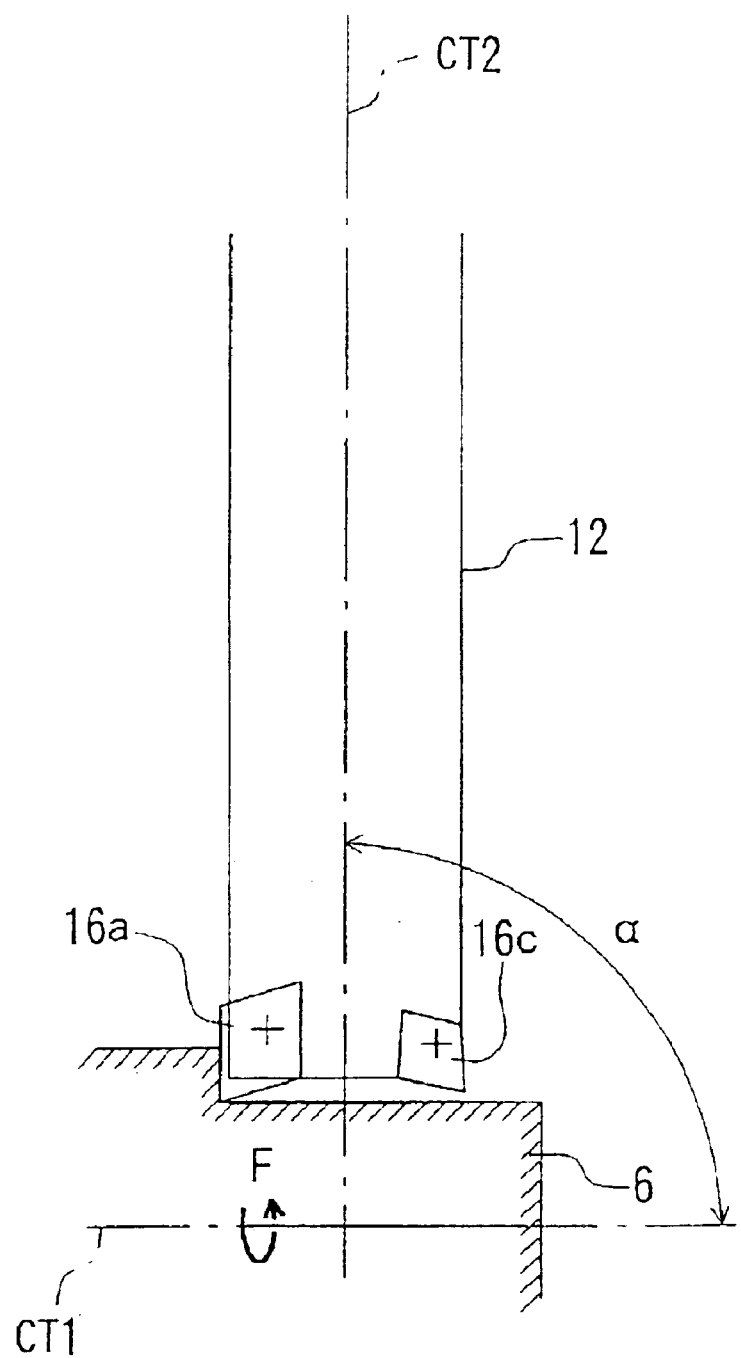
FIG. 15 is a schematic view showing turning machining on an outer diameter with the tool holder as shown in FIG. 14.
Figure 16:
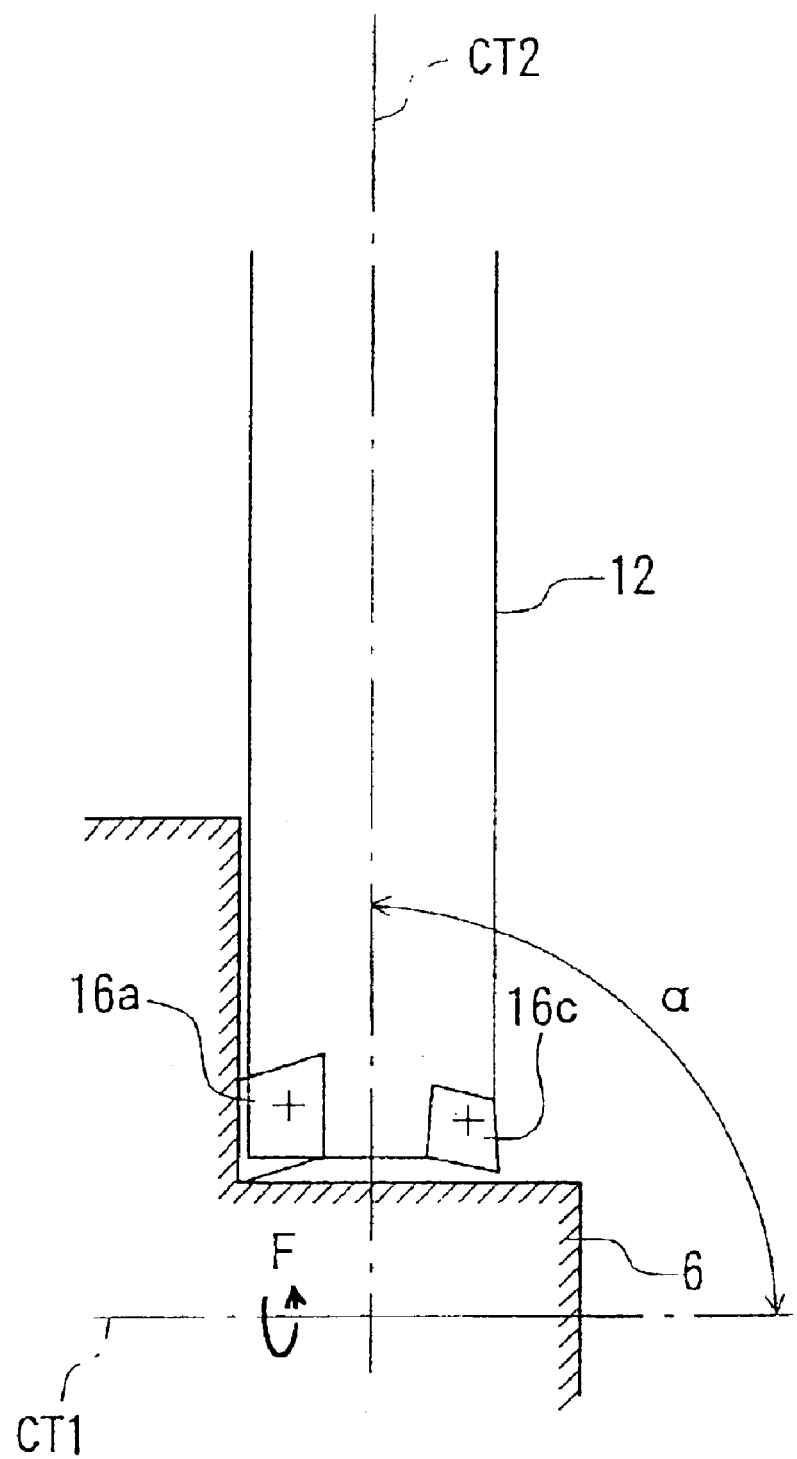
FIG. 16 is a schematic view showing turning machining on an end face of an outer diameter with the tool holder as shown in FIG. 14.

FIGS. 12 through 14 show a fourth embodiment of the tool holder according to the invention. FIG. 12 is a plan view showing a positional relation between the spindle stock and the tool rest in a turret lathe, FIG. 13 is a plan view showing a positional relation between the turret and the tool holder, FIG. 14 is a sectional view of the tool holder according to the invention, FIG. 15 is a schematic view showing turning machining on an outer diameter with the tool holder as shown in FIG. 14, and FIG. 16 is a schematic view showing turning machining on an end face of an outer diameter with the tool holder as shown in FIG. 14.

In FIG. 12, the same reference number is attached to an element the same as one in FIG. 1, so that its explanation is omitted. In the turret lathe 1 to be used in this embodiment, a tool holder 110 has a B-axis function although a turret base 8a of the tool rest 7 has no B-axis function.

As shown in FIG. 13, a turret 10a has a motor 100, and a mill spindle 101 rotatably supported by the turret 10a and connected with the motor 100, and a joint 102 is formed at one end of the mill spindle 101 (the lower side of the paper).

The tool holder 110 has a base 111 as a base portion to be detachably attached to a portion for installing the mill tool of the turret 10a, and the base 111 is provided with a transmission shaft 113 rotatably supported, having a clutch joint 112 at its end (the upper side of the drawing) to be connected with the joint 102 of the mill spindle 101 when the tool holder 110 is attached to the turret 10a, And, a bevel gear 115 fixed at one end of the transmission shaft 113 (the lower side of the paper), a rotational axis 116 rotatably supported by the base 111 with the axial center CT2 of the B-axis orthogonal to an axial center CT6 of the transmission shaft 113 (in front and rear direction of the paper) as its center, and a bevel gear 117 fixed at one end of the rotational axis 116 so as to engage with the bevel gear 115 are located at the base 111. And, a housing 118 as a housing portion is fixed by the rotational axis 116.

Then, the motor 100 is driven in such a state that the tool holder 110 is installed on the turret 10a, and the bevel gear 115 is rotated in the direction as shown by the arrows A and B, so that the housing 118 can be swung in the direction as shown by the arrows A and B with the axial center CT2 of the B-axis as its center.

As shown in FIG. 14, a head stock 120 and a tail stock 121 are fixed at both ends in front and rear direction of the housing 118 (in the direction of the axial center CT4 of the tool spindle orthogonal to the axial center CT2, described hereinafter). A motor 122 is fixed by the tail stock 121, and a joint 125 rotatably and slidably supported by the tail stock 121 through a bearing 123 is fixed by the rotational axis of the motor 122. And, an annular anchoring coupling 126 having an end face where a plurality of teeth are radially formed apart a predetermined space from each other is fixed by the tail stock 121. A tool spindle 127 is rotatably slidably supported by the head stock 120 through a bearing 128.

A clamping means 130 for clamping the tool spindle 127 at its indexed rotational position is comprised of the anchoring coupling 120, the spindle coupling 127a and a driving means described hereinafter. The spindle coupling 127a is comprised of a plurality of teeth which are radially formed apart a predetermined space from each other so as to engage with the anchoring coupling 120 at a rear end of the tool spindle 127 (at the right side of the paper). And, the tool spindle 127 is slidably connected with the joint 125 through a plurality of disc springs 131 formed between this and joint 125, and is always energized in the top end direction (the left side of the paper). The motor 122 may have a rotary encoder therein. The motor 122 has both functions, a milling function of successively rotating the tool spindle 127 and a multipoint orientation function of detecting rotational angle by a rotary encoder so as to index the tool spindle 127 by its rotation. Then, the motor 127 can properly rotate and drive the tool spindle 127, including successive rotation and index rotation in such a state that the engagement between the spindle coupling 127a and the anchoring coupling 126 is released. That is, the multipoint orientation function of the motor 122 comprises an indexing means for the tool spindle 127.

An annular fluid pressure cylinder 132 (only "the cylinder 132" hereinafter) is formed by a space enclosed by the housing 118, the head stock 120, the tool spindle 127 and the bearing 128, and the housing 118 is provided with a port 133 which is an entrance and an exit of fluid with respect to the cylinder 132. An annular piston 135 is located in the cylinder 132 so as to be free to be slided, and the piston 135 comprises a driving means 136 for moving the tool spindle 127 in a direction as shown by the arrows P and Q.

When the cylinder 132 is not supplied with fluid, the tool spindle 127 is pushed in the direction as shown by the arrow P by the elastic force of the disc spring 131 and the engagement between the spindle coupling 127a and the anchoring coupling 126 is released, so that the tool spindle 127 can rotate. Therefore, the tool spindle 127 can be rotated for indexing by the multipoint orientation function of the motor 116 or can be normally successively rotated in such a state that the cylinder 132 is not supplied with fluid. Then, the tool spindle 127 is successively rotated, and a drilling machining and a fraise machining, such as a milling machining, can be executed, thereby.

When the cylinder 132 is supplied with fluid pressure and the tool spindle 127 is moved in the direction as shown by the arrow Q through the piston 135, the spindle coupling 127a and the anchoring coupling 126 are engaged with each other so as to become the clamping state, and the rotation of the tool spindle 127 is thereby restricted. Therefore, the cylinder 132 is supplied with fluid pressure after the tool spindle 127 is rotated for indexing so as to clamp the tool spindle 127, and turning machining can be thereby executed.

When stopping supplying the cylinder 132 with fluid pressure in the state of the tool spindle 127 clamped, the tool spindle 127 is moved in the direction as shown by the arrow P by the elastic force of the disc spring 131, and the engagement between the spindle coupling 127a and the anchoring coupling 126 is cut so as to release the clamping state of the tool spindle 127.

The motor 122 may drive the tool spindle 127 through intermittent rotational mechanism, such as Geneva mechanism, so as to simply index the tool spindle 127 by rotating.

Using of the tool holder according to the fourth embodiment makes machining as shown in FIGS. 15, 16 possible, in addition to various kinds of machining as shown in FIGS. 4, 5, 7 through 10 with the tool holder 21 (FIG. 2), the tool holder 41 (FIG. 6) and the tool holder 71 (FIG. 11) according to the first through the third embodiments.

In order to execute turning machining on the outer diameter of the workpiece 6 as shown in FIG. 15, the cutting edge 16a of the complex tool 12 is selected according to a machining program, and the B-axis angle α of the axial center CT2 of the complex tool 12 with respect to the axial center CT1 of the workpiece 6 is set at 92 degrees, for instance. The complex tool 12 is fixed, and the workpiece 6 is rotated in the direction as shown by the arrow F at a predetermined rotational speed. And, the complex tool 12 is properly moved with respect to the workpiece 6, and then, the outer diameter of the workpiece 6 can be turned by the cutting edge 16a.

In case of turning machining on the end face of the outer diameter of the workpiece 6 as shown in FIG. 16, the cutting edge 16a of the complex tool 12 is selected according to a machining program, and the B-axis angle α of the axial center CT2 of the complex tool 12 with respect to the axial center CT1 of the workpiece 6 is set at 91 degrees, for instance. The complex tool 12 is fixed, and the workpiece 6 is rotated in the direction as shown by the arrow F at a predetermined rotational speed. And, the complex tool 12 is properly moved and driven with respect to the workpiece 6. Then, the end face of the outer diameter of the workpiece 6 can be turned by the cutting edge 16a.

In the case of the machining as shown in FIGS. 15 and 16, the turret base 8a of the tool rest 7 of the turret lathe 1 (FIG. 12) has no B-axis function. If the turret base 8 of the turret lathe 1 has the B-axis function or the tool holder 110 can take sufficient B-axis rotational angle in the direction as shown by the arrows A and B of FIG. 13, machining as shown in FIGS. 17 and 18, for instance, are possible in addition to various kinds of machining as shown in FIGS. 4, 5, 7 through 10, 15, 16.

Figure 17:
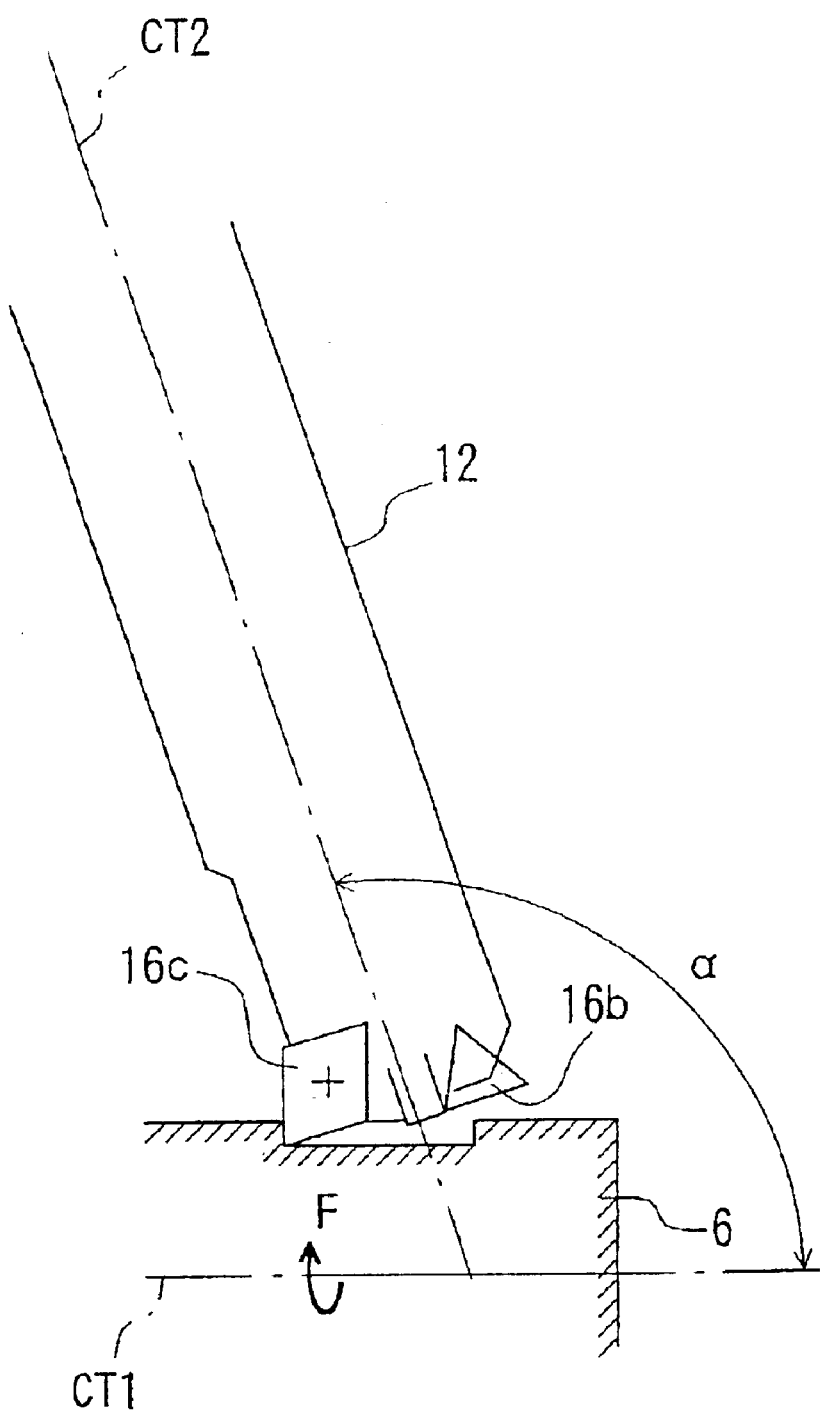
FIG. 17 is a schematic view showing grooving machining by turning an outer diameter with the tool holder as shown in FIG. 14.

In case of a grooving machining by turning the outer diameter of the workpiece 6 as shown in FIG. 17, a cutting edge 16c is selected according to a machining program, and the B-axis angle α of the axial center CT2 of the complex tool 12 with respect to the axial center CT1 of the workpiece 6 is set at 110 degrees, for instance, by the B-axis function of the turret base 8 or the B-axis function of the tool holder 110 (FIGS. 12, 13). The complex tool 12 is fixed, and the workpiece 6 is rotated in the direction as shown by the arrow F at a predetermined rotational speed. And, the complex tool 12 is properly moved and driven with respect to the workpiece 6. Then, grooving machining can be executed on the outer diameter of the workpiece 6 by the cutting edge 16c.

Figure 18:
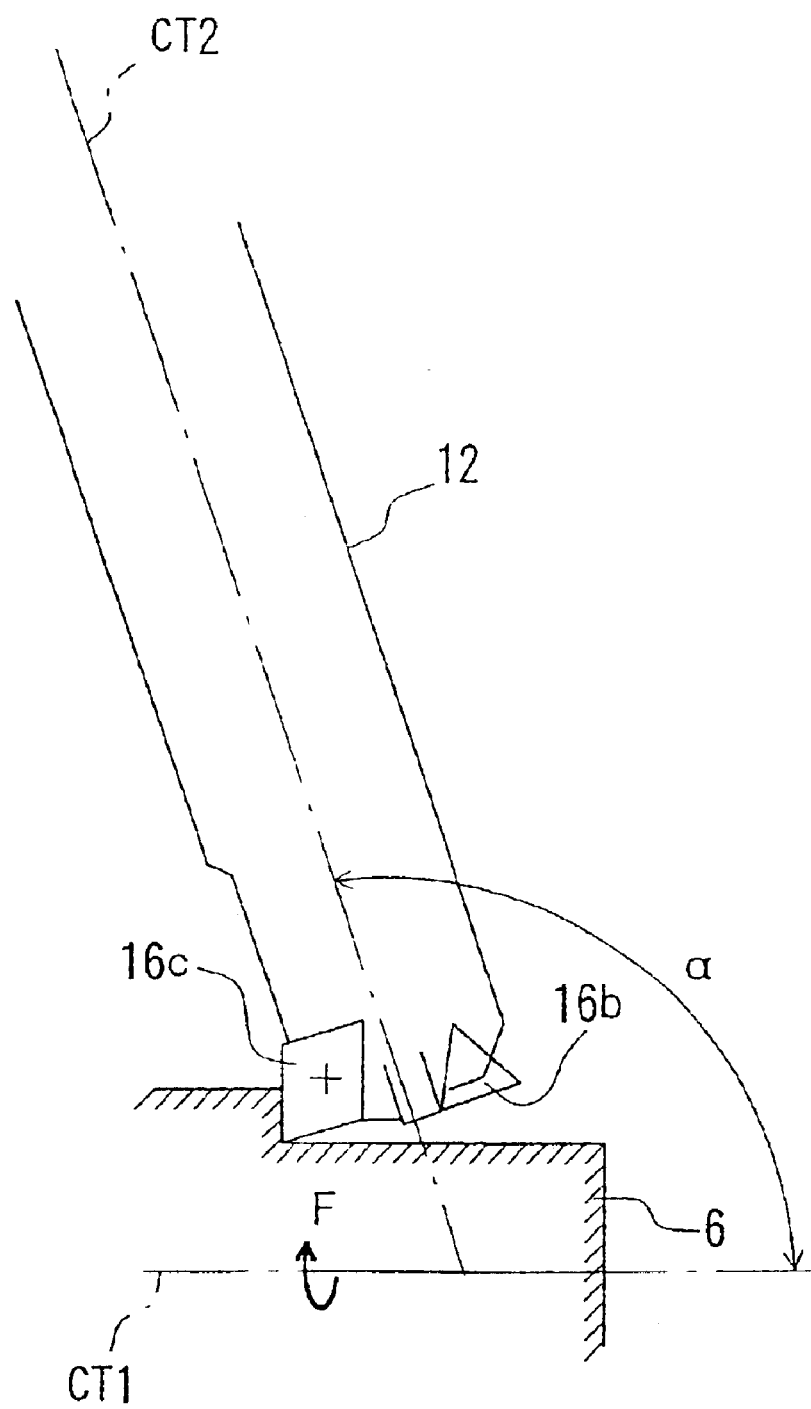
FIG. 18 is a schematic view showing recessing machining by turning an outer diameter with the tool holder as shown in FIG. 14.

In order to execute recessing machining by turning the outer diameter of the workpiece 6, as shown in FIG. 18, the cutting edge 16c is selected according to a machining program, and the B-axis angle α of the axial center CT2 of the complex tool 12 with respect to the axial center CT1 of the workpiece 6 is positioned at 105 degrees, for instance by the B-axis function of the turret base 8 or the B-axis function of the turret 10a (see FIGS. 12 and 13). And, the complex tool 12 is fixed, and the workpiece 6 is rotated in the direction as shown by the arrow F at a predetermined rotational speed. Then, the complex tool 12 is properly moved and driven with respect to the workpiece 6. Then, recessing machining can be executed on the outer diameter of the workpiece 6 by the cutting edge 16c.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

What is claimed is:

1. A tool holder for turret lathe, for attaching a complex tool having a plurality of kinds of cutting edges to a turret of said turret lathe, said tool holder comprising:
    a base portion formed so as to be freely attached and detached at a position for attaching a tool of said turret;
    a rotatable tool spindle provided at said base portion, such that said complex tool can be attached thereto and detached therefrom;
    an indexing means for indexably rotating said tool spindle at an indexed position corresponding to a position where each said cutting edge of said complex tool is located, provided at said tool spindle;
    said indexing means having a first engagement portion and a second engagement portion which are provided on said tool spindle along a longitudinal axis of said tool spindle;
    each of said first engagement portion and said second engagement portion having a plurality of planes which are formed at a periphery of said tool spindle so as to correspond to said indexed positions;
    a first actuator and a second actuator provided at said base portion so as to respectively correspond to said first engagement portion and said second engagement portion, and being free to be reciprocated and driven;
    said first actuator having a first driving portion for driving and rotating said tool spindle a predetermined angle with engagement with said first engagement portion, and having a clamping face for clamping said tool spindle with selective engagement with said plane comprising said first engagement portion; and
    said second actuator having a second driving portion for driving and rotating said tool spindle a predetermined angle with engagement with said second engagement portion.

2. A tool holder for turret lathe, for attaching a complex tool having a plurality of kinds of cutting edges to a turret of said turret lathe, said tool holder comprising:
    a base portion formed so as to be freely attached and detached at a position for attaching a tool of said turret;
    a rotatable transmission shaft having a clutch at one end provided at said base portion;
    a housing portion for rotatably supporting a tool spindle, attaching and detaching said complex tool thereto and therefrom, provided on said base portion so as to be rotatable about a rotational axis orthogonal to a longitudinal axis of said tool spindle;
    said transmission shaft connected with said housing portion so as to rotate said housing portion about said rotational axis;
    an indexing means for indexably rotating said tool spindle at indexed positions respectively corresponding to positions of said cutting edges of said complex tool, provided at said housing portion; and
    a clamping means for clamping said tool spindle at said indexed position indexably rotated by said indexing means, provided at said housing portion.

3. The tool holder for turret lathe according to claim 2, wherein said housing portion is provided with a milling rotational driving means for successively rotating said tool spindle for milling machining.

4. The tool holder for turret lathe according to claim 3, wherein said milling rotational driving means also functions as said indexing means.

5. A tool holder for turret lathe, for attaching a complex tool having a plurality of kinds of cutting edges to a turret of said turret lathe, said tool holder comprising:
    a base portion formed so as to be freely attached and detached at a position for attaching a tool of said turret;
    a rotatable transmission shaft having a clutch at one end provided at said base portion,
    a housing portion for rotatably supporting a tool spindle, attaching and detaching said complex tool thereto and therefrom, provided on said base portion so as to be rotatable about a rotational axis orthogonal to a longitudinal axis of said tool spindle;
    said transmission shaft connected with said housing portion so as to rotate said housing portion about said rotational axis;
    an indexing unit for indexably rotating said tool spindle at indexed positions respectively corresponding to positions of said cutting edges of said complex tool, provided at said housing portion; and
    a clamping unit for clamping said tool spindle at said indexed position indexably rotated by said indexing unit, provided at said housing portion.

6. The tool holder for turret lathe according to claim 5, wherein said housing portion is provided with a milling rotational driving unit for successively rotating said tool spindle for milling machining.

7. The tool holder for turret lathe according to claim 6, wherein said milling rotational driving unit also functions as said indexing unit.

* * * * *